US007280604B2

(12) United States Patent
Giannakis et al.

(10) Patent No.: US 7,280,604 B2
(45) Date of Patent: Oct. 9, 2007

(54) SPACE-TIME DOPPLER CODING SCHEMES FOR TIME-SELECTIVE WIRELESS COMMUNICATION CHANNELS

(75) Inventors: Georgios B. Giannakis, Minnetonka, MN (US); Xiaoli Ma, St. Paul, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 735 days.

(21) Appl. No.: 10/421,678

(22) Filed: Apr. 21, 2003

(65) Prior Publication Data

US 2004/0082303 A1 Apr. 29, 2004

Related U.S. Application Data

(60) Provisional application No. 60/374,886, filed on Apr. 22, 2002, provisional application No. 60/374,935, filed on Apr. 22, 2002, provisional application No. 60/374,934, filed on Apr. 22, 2002, provisional application No. 60/374,981, filed on Apr. 22, 2002, provisional application No. 60/374,933, filed on Apr. 22, 2002.

(51) Int. Cl.
*H04L 27/28* (2006.01)
*H04B 7/02* (2006.01)
(52) U.S. Cl. ...................... 375/260; 375/267
(58) Field of Classification Search .............. 375/260, 375/267, 299, 347; 455/101, 129, 561, 562.1
See application file for complete search history.

(56) References Cited

U.S. PATENT DOCUMENTS 6,005,876 A * 12/1999 Cimini, Jr. et al. ......... 370/525

| | | | |
|---|---|---|---|
| 6,188,717 B1 | 2/2001 | Kaiser et al. | |
| 6,891,897 B1 * | 5/2005 | Bevan et al. ............... | 375/265 |
| 6,898,248 B1 | 5/2005 | Elgamal et al. | |
| 2002/0167962 A1 | 11/2002 | Kowalski | |
| 2004/0146014 A1 | 7/2004 | Hammons, Jr. et al. | |

OTHER PUBLICATIONS

K.R. Narayanan et al., "Low Complexity Turbo Equalization with Binary Precoding," 5 pages, IEEE, 2000.
W. W. Peterson et al., *Error-Correcting Codes*, Second Edition, MIT Press 1972, pp. 125, 129-131, 556.
G.C. Clark, Jr. et al., *Error-Correction Coding for Digital Communications*, Plenum Press, pp. 9, 10, 420.
J. Boutros and E. Viterbo, "Signal Space Diversity: A Power-and Bandwidth-Efficient Diversity Technique for the Rayleigh Fading Channel," IEEE Transactions on Information Theory, vol. 44, No. 4, pp. 1453-1467, Jul. 1998.
H. Bolcskei and A.J. Paulraj, "Space-Frequency Codes for Broadband Fading Channels," in Proc. of IEEE Int. Symposium on Information Theory, pp. 219, Washington D.C., Jun. 24-29, 2001.
H. Bolcskei and A.J. Paulraj, "Space-Frequency Coded Broadband OFDM Systems," in Proc. of Wireless Communications and Networking Conference, vol. 1, pp. 1-6, Chicago, IL, Sep. 23-28, 2000.

(Continued)

*Primary Examiner*—Don N. Vo
(74) *Attorney, Agent, or Firm*—Shumaker & Sieffert, P.A.

(57) ABSTRACT

Space-time Doppler (STDO) coding techniques are describe for time-selective channels. In particular, a STDO coded system is capable of achieving a maximum Doppler diversity for time-selective frequency-flat channels. As demonstrated herein, this maximum diversity may be represented as Q+1, where Q is the number of bases in a generalized Basis Expansion Model (BEM) for time-frequency selective channels. In addition, linearly precoded transmissions are described to collect this maximum diversity gain.

38 Claims, 11 Drawing Sheets

OTHER PUBLICATIONS

D.K. Borah and B. Hart, "Receiver Structures for Time-Varying Frequency-Selective Fading Channels," IEEE Journal on Selected Areas in Communications, vol. 17, No. 11, pp. 1863-1875, Nov. 1999.

J.K. Cavers, "Optimized Use Of Diversity Modes In Transmitter Diversity Systems," in Proc. of the Vehicular Technology Conf., vol. 3, Amsterdam, The Netherlands, 1999, pp. 1768-1773.

D. Dardari and V. Tralli, "High-Speed Indoor Wireless Communications at 60 GHz with Coded OFDM," IEEE Transactions on Communications, vol. 47, No. 11, pp. 1709-1721, Nov. 1999.

V.M. DaSilva and E. S. Sousa, "Fading-Resistant Modulation Using Several Transmitter Antennas," IEEE Transactions on Communications, vol. 45, No. 10, pp. 1236-1244, Oct. 1997.

A. Duel-Hallen, S. Hu, and H. Hallen, "Long-Range Prediction of Fading Signals," IEEE Signal Processing Magazine, pp. 62-75, May 2000.

S. Floyd, M. Handley, J. Padhye, and J. Widmer, "Equation-Based Congestion Control for Unicast Applications," i Proc. Of SIGCOMM'00.

G.J. Foschini and M.J. Gans, "On Limits of Wireless Communications in a Fading Environment When Using Multiple Antennas," Wireless Personal Communications, vol. 6, No. 3, pp. 311-335, Mar. 1998.

G.B. Giannakis, X. Ma, G. Leus, and S. Zhou, "Space-Time-Doppler Coding Over Time-Selective Fading Channels With Maximum Diversity And Coding Gains," Proc. Of Intl. Conf. On ASSP, Orlando, FL, May 13-17, 2002, pp. III-2217-III-2220.

G.B. Giannakis and S. Zhou, "Optimal Transmit-Diversity Precoders for Random Fading Channels," in Proc. of Globecom Conf., vol. 3, San Francisco, CA, Nov. 27-Dec. 1, 2000.

G.B. Giannakis and C. Tepedelenlioglu, "Basis Expansion Models and Diversity Techniques for Blind Identification and Equalization of Time-Varying Channels," Proceedings of the IEEE, vol. 86, No. 10,pp. 1969-1986, Oct. 1998.

X. Giraud, E. Boutillon, and J.C. Belfiore, "Algebraic Tools to Build Modulation Schemes for Fading Channels," IEEE Transactions on Information Theory, vol. 43, pp. 938-952, May 1997.

D. Gore, S. Sandhu, and A. Paulraj, "Delay Diversity Code for Frequency Selective Channels," Electronics Letters, vol. 37, No. 20, pp. 1230-1231, Sep. 27, 2001.

J. Hagenauer, and P. Hoeher, "A Viterbi Algorithm with Soft-Decision Outputs and Its Applications," in Proc. Of the IEEE 1989 Global Communications Conference, Dallas, Texas, pp. 1680-1686, Nov. 1989.

B. Hassibi and B.M. Hochwald, "High-Rate Codes that are Linear in Space and Time," IEEE Trans. On Information Theory, pp. 1-56, revised Apr. 2001; URL: http://mars.bell-labs.com/cm/ms/what/mars/index.html.

A. Hiroike, F. Adachi, and N. Nakajima, "Combined Effects of Phase Sweeping Transmitter Diversity and Channel Coding," IEEE Trans. On Vehicular Technology, pp. 170-176, May 1992.

R. Hoshyar, S.H. Jamali, and A.R.S. Bahai, "Turbo Coding Performance in OFDM Packet Transmissions," in Proc. IEEE VTC, Tockyo, Japan, 2000, vol. 2, pp. 805-810.

S.A. Jafar, S. Vishwanath, and A. Goldsmith, "Channel Capacity and Beamforming for Multiple Transmit and Receive Antennas with Covariance Feedback," in Proc. of International Conference on Communications, vol. 7, Helsinki, Finland, Jun. 2001.

G. Jongren, M. Skoglund, and B. Ottersten, "Combining Transmit Beamforming and Orthogonal Space-Time Block Codes by Utilizing Side Information," IEEE Sensor Array and Multichannel Signal Processing Workshop, Mar. 14, 2000.

G. Jongren, M. Skoglund, and B. Ottersten, "Combining Transmit Antenna Weights and Orthogonal Space-Time Block Codes by Utilizing Side Information," In Proceedings of the 33rd Asilomar Conference on Signals, Systems and Computers, Oct. 23, 1999.

G. Jongren and M. Skoglund, "Utilizing Quantized Feedback Information in Orthogonal Space-Time Block Coding," in Proceedings IEEE Global Telecommunications Conference, Nov. 27, 2000.

G. Kaplan and S. Shamai, "Achievable Performance Over the Correlated Rician Channel," IEEE Transactions on Communications, vol. 42, No. 11, pp. 2967-2978, Nov. 1994.

W.-Y. Kuo and M.P. Fitz, "Design and Analysis of Transmitter Diversity Using Intentional Frequency Offset for Wireless Communications," IEEE Trans. On Vehicular Technology, vol. 46, No. 4, pp. 871-881, Nov. 1997.

B. Le Foch, M. Alard, and C. Berrou, "Coded Orthogonal Frequency Division Multiplex," Proceedings of the IEEE, vol. 83, No. 6, pp. 982-996, Jun. 1995.

G. Leus, S. Zhou, and G.B. Giannakis, "Multi-User Spreading Codes Retaining Orthagonality through Unknown Time- and Frequency-Selective Fading," Proc. Of GLOBECOM, vol. 1, pp. 259-263, San Antonio, TX, Nov. 25-29, 2001.

Y. Li, "Simplified Channel Estimation for OFDM Systems With Multiple Transmit Antennas," IEEE Transactions On Wireless Communications, vol. 1, No. 1, pp. 67-75, Jan. 2002.

E. Lindskog and A. Paulraj, "A Transmit Diversity Scheme for Channels with Intersymbol Interference," Proceedings Of International Conference On Comm., vol. 1, pp. 307-311, Jun. 2000.

Y. Liu, M. P. Fitz, and O. Y. Takeshita, "Space-Time Codes Performance Criteria and Design for Frequency Selective Fading Channels," Proc. Of International Conference on Comm., Helsinki, Finland, Jun. 11-15, 2001.

Z. Liu, Y. Xin, and G.B. Giannakis, "Linear Constellation Precoding for OFDMW With Maximum Multipath Diversity and Coding Gains," IEEE Transactions On Communications, vol. 51, No. 3, pp. 416-427, Mar. 2003.

Z. Liu, Y. Xin, and G.B. Giannakis, "Space-Time-Frequency Coded OFDM Over Frequency-Selective Fading Channels," IEEE Transactions on Signal Processing, vol. 50, No. 10, pp. 2465-2476, Oct. 2002.

Z. Liu, Y. Xin, and G.B. Giannakis, "Space-Time-Frequency Trellis Coding for Frequency-Selective Fading Channels", pp. 145-149, 2002.

Z. Liu, Y. Xin, and G.B. Giannakis, "Space-Time-Frequency Block Coded OFDM with Subcarrier Grouping and Constellation Precoding," Proc. Of Intl. Conf. on ASSP, Orlando, FL, May 13-17, 2003, pp. III-2205-III-208.

B. Lu and X. Wang, "Space-Time Code Design in OFDM Systems," Proc. Of Global Telecommunications Conferences, San Francisco, CA, vol. 2, pp. 1000-1004, Nov. 27-Dec. 1, 2000.

X. Ma and G.B. Giannakis, "Space-Time Coding for Doubly-Selective Channels," Proc. Of Intl. Conf. On Circuits and Systems, Scottsdale, AZ, May 25-29, 2002, pp. III-647-III-650.

X. Ma and G.B. Giannakis, "Maximum-Diversity Transmissions over Time-Selective Wireless Channels," Proc. of Wireless Communications and Networking Conf., Orlando, FL, Mar. 17-21, 2002, pp. 497-501.

X. Ma and G.B. Giannakis, "Maximum-Diversity Transmissions Over Doubly Selective Wireless Channels," IEEE Transactions On Information Theory, vol. 49, No. 7, pp. 1832-1840, Jul. 2003.

X. Ma, C. Tepedelenlioglu, G.B. Giannakis, and S. Barbarossa, "Non-Data-Aided Carrier Offset Estimators for OFDM With Null Subcarrieres: Identifiability, Algorithms, and Performance," IEEE Journal on Selected Areas in Communications, vol. 19, No. 12, pp. 2504-2515, Dec. 2001.

J. Mahdavi and S. Floyd, "TCP-Friendly Unicast Rate-Based Flow Control," Jan. 1997, http://www.psc.edu/networking/papers/tcp_friendly.html.

M. Martone, "Wavelet-Based Separating Kernels for Sequence Estimation with Unknown Rapidly Time-Varying Channels," IEEE Communications Letters, vol. 3, No. 3, pp. 78-80, Mar. 1999.

M. Mathis, J. Semke, J. Mahdavi, and T. Ott, "The Macroscopic Behavior of the TCP Congestion Avoidance Algorithm," Computer Communication Review, Vo. 27 No. 3, Jul. 1997, pp. 1-16.

B. Muquet, M. de Courville, G.B. Giannakis, Z. Wang, and P. Duhamel, "Reduced Complexity Equalizers For Zero-Padded OFDM Transmissions".

A.F. Naguib, "On The Matched Filter Bound of Transmit Diversity Techniques," IEEE International Conference on Communications, vol. 2, pp. 596-603, Helsinki, Finland, Jun. 11-14, 2001.

A. Narula, M.J. Lopez, M.D. Trott, and G.W. Wornell, "Efficient Use of Side Information in Multiple-Antenna Data Transmission over Fading Channels," IEEE Journal on Selected Areas In Communications, vol. 16, No. 8, pp. 1423-1436, Oct. 1998.

A. Narula, M.D. Trott, and G.W. Wornell, "Performance Limits of Coded Diversity Methods for Transmitter Antenna Arrays," IEEE Transactions On Information Theory, vol. 45, No. 7, pp. 2418-2433, Nov. 1999.

S. Ohno and G.B. Giannakis, "Optimal Training and Redundant Precoding for Block Transmissions With Application to Wireless OFDM," IEEE Transaction on Communications, vol. 50, No. 12, pp. 2113-2123, Dec. 2002.

M.F. Pop and N.C. Beaulieu, "Limitations of Sum-of-Sinusoids Fading Channel Simulators," IEEE Transactions On Communications, vol. 49, No. 4, pp. 699-708, Apr. 2001.

R. Rajaie, H. Yu, M. Handely, and D. Estrin, "Multimedia Proxy Caching Mechanism for Quality Adaptive Streaming Applications in the Internet," Technical report 99-709, Computer Science Department, USC.

R. Rajaie, M. Handely, and D. Estrin, "Quality Adapation for Congestion Controlled Video Playback over the Internet," in Proc. of SIGCOMM'99, pp. 1-16.

S. Sen, J. Rexford, and D. Towsley, "Proxy Prefix Caching for Multimedia Streams," in Proc. of IEEE INFOCOM'99.

L. Rizzo, IP Dummynet, pp. 1-9, http://info.iet.unipi.it/luigi/ip_dummynet/.

O. Rose, "Statistical Properties of MPEG Video Traffic and Their Impact on Traffic Modeling in ATM Network," TR-101, Institute of Computer Science, University of Wurzburg, Germany, Feb. 1995, pp. 1-25.

M. Rouanne and D.J. Costello, Jr., "An Algorithm for Computing the Distance Spectrum of Trellis Codes," IEEE Journal on Selected Areas in Communications, vols. 7, No. 6, pp. 929-940, Aug. 1989.

A. Ruiz, J.M. Cioffi, and S. Kasturia, "Discrete Multiple Tone Modulation with Coset Coding for the Spectrally Shaped Channel," IEEE Transactions on Communications, vol. 40, No. 6, pp. 1012-1029, Jun. 1992.

H.R. Sadjadpour, "Application of Turbo Codes for Discrete Multi-Tone Modulation Schemes," in Proc. Of Intl. Conf. On Com., Vancouver, Canada, 1999, vol. 2, pp. 1022-1027.

A.M. Sayeed and b. Aazhang, "Joint Multipath-Doppler Diversity in Mobile Wireless Communications," IEEE Transactions On Communications, vol. 47, No. 1, pp. 123-132, Jan. 1999.

D.-S. Shiu, G.J. Foschini, M.J. Gans, and J.M. Kahn, "Fading Correlation and Its Effect on the Capacity of Multielement Antenna Systems," IEEE Transactions on Communications, vol. 48, No. 3, pp. 502-513, Mar. 2000.

A. Stamoulis, G.B. Giannakis, and A. Scaglione, "Block FIR Decision-Feedback Equalizers for Filterbank Precoded Transmissions with Blind Channel Estimation Capabilities," IEEE Transactions On Communications, vol. 49, No. 1, pp. 69-83, Jan. 2001.

L. Sylla, P. Fortier, and H.T. Huynh, "Performance of COFDM Using Turbo Codes," in Proc. Of IEEE Canadian Conference on Electrical and Computer Engineering, Edmonton, Alta, Canada, May 9-12, 1999.

V. Tarokh, H. Jafarkhani, and A.R. Calderbank, "Space-Time Block Codes from Orthogonal Designs," IEEE Transactions On Information Theory, vol. 45, No. 5, pp. 1456-1467, Jul. 1999.

C. Tepedelenlioglu and G.B. Giannakis, "Transmitter Redundancy for Blind Estimation and Equalization of Time- Frequency-Selective Channels," IEEE Transactions On Signal Processing, vol. 48, No. 7, pp. 2029-2043, Jul. 2000.

M.K. Tsatsanis and G.B. Giannakis, "Modelling and Equalization of Rapidly Fading Channels," International Journal of Adaptive Control and Signal Processing, vol. 10, pp. 159-176, 1996.

E. Visotsky and U. Madhow, "Space-Time Transmit Precoding With Imperfect Feedback," IEEE Transactions on Information Theory, vol. 47, No. 6, pp. 2632-2639, Sep. 2001.

A.J. Viterbi, "An Intuitive Justification and a Simplified Implementation of the MAP Decoder for Convolutional Codes," IEEE Journal on Selected Areas in Communications, vol. 16, No. 2, pp. 260-264, Feb. 1998.

E. Viterbo, and J. Boutros, "A Universal Lattice Code Decoder for Fading Channels," IEEE Transactions on Information Theory, vol. 45, No. pp. 1639-1642, Jul. 1999.

J. Vogt, K. Koora, A. Finger, and G. Fettweis, "Comparison of Different Turbo Decoder Realizations For IMT-2000," in Global Telecommunications Conference—GLOBECOM'99, Rio de Janeiro, Brazil, 1999, vol. 5, pp. 2704-2708.

F.W. Vook and T.A. Thomas, "Transmit Diversity Schemes for Broadband Mobile Communication Systems," Proc. Of Vehicular Tech. Conf., vol. 6, pp. 2523-2529, Boston MA, Sep. 24-28, 2000.

H. Wang, J. Belzile, and C.L. Despins, "64-QAM OFDM With TCM Coding and Waveform Shaping In A Time-Selective Rician Facing Channel," in Proc. Of Int'l Zurich Seminar on Broadband Comm., Berdun, Que., Canada, 2000, pp. 257-261.

X. Wang and H.V. Poor, "Iterative (Turbo) Soft Interface Cancellation and Decoding for Coded CDMA," IEEE Transactions on Communications, vol. 47, No. 7, pp. 1046-1061, Jul. 1999.

Y. Wang, Z.-L. Zhang, D. Du, and D. Su, "A Network-Conscious Approach to End-to-End Video Delivery Over Wide Ares Networks Using Proxy Servers," in Proceedings of IEEE INFOCOM'98.

Z. Wang, S. Zhou, and G.B. Giannakis, "Joint Coding-Precoding with Low Complexity Turbo-Decoding," IEEE Transactions on Wireless Communications, vol. XXX, No. XXX, pp. 1-11, Month 2003; also in Proc. Of the European Wireless Conference, Florence, Italy, Feb. 25-28.

Z. Wang and G.B. Giannakis, "Lineraly Precoded or Coded OFDM against Wireless Channel Fades?" in Third IEEE Signal Processing Workshop on Signal Processing Advances in Wireless Communication, Taoyuan, Taiwan, Mar. 20-23, 2001.

Z. Wang and G.B. Giannakis, "Complex-Field Coding for OFDM Over Fading Wireless Channels" IEEE Transactions on Information Theory, vol. 49, No. 3, pp. 707-720, Mar. 2003.

Z. Wang and G.B. Giannakis, "Wireless Multicarrier Communications: Where Fourier Meets Shannon," IEEE Signal Processing Magazine, vol. 17, No. 3, pp. 29-48, May 2000.

A. Wittneben, "A New Bandwidth Efficient Transmit Antenna Modulation Diversity Scheme for Linear Digital Modulation," Proc. of IEEE International Conference on Comm., vol. 3, pp. 1630-1634, Geneva, Switzerland, May 23-26, 1993.

Y. Xin, Z. Wang, and G.B. Giannakis, "Space-Time Constellation-Rotating Codes Maximizing Diversity and Coding Gains," Proc. Of GLOBECOM, vol. 1, pp. 455-459 San Antonio, TX, Nov. 25-27, 2001.

Q. Yan and R.S. Blum, "Robust Space-Time Block Coding for Rapid Fading Channels," IEEE Global Telecommunications Conference, vol. 1, pp. 460-464, San Antonio, TX, Nov. 25-29, 2001.

Z.-L. Zhang, S. Nelakuditi, R. Aggarwal, and R. Tsang, "Efficient Selective Frame Discard Algorithms for Stored Video Delivery across Resource Constrained Networks," in Proc. of IEEE INFOCOM'99, pp. 1-26.

S. Zhou, G.B. Giannakis, and C. Le Martret "Chip-Interleaved Block-Spread Code Division Multole Access," IEEE Transactions On Communications, vol. 50, No. 2, pp. 235-248, Feb. 2002.

S. Zhou and G.B. Giannakis, "Optimal Transmitter Eigen-Beamforming and Space-Time Block Coding Based in Channel Correlations," IEEE Trans. Signal processing, vol. 50, No. 10, pp. 553-557, Oct. 2002.

S. Zhou and G.B. Giannakis, "Space-Time Coding With Maximum Diversity Gains Over Frequency-Selective Fading Channels," IEEE Signal Processing Letters, vol. 8, No. 10, pp. 269-272, Oct. 2001.

S. Zhou, Z. Wang, N. Bapat, G.B. Giannakis, "Turbo Decoding of Error Control Coded and Urinary Precoded OFDM", pp. 1237-1241, University of Minnesota.

S. Zhou, B. Muquet, and G.B. Giannakis, "Subspace-Based (Semi-) Blind Channel Estimation for Block Precoded Space-Time OFDM," IEEE Transactions on Signal Processing, vol. 50, No. 5, pp. 1215-1228, May 2002.

* cited by examiner

SPACE-TIME DOPPLER CODING SCHEMES FOR TIME-SELECTIVE WIRELESS COMMUNICATION CHANNELS

This application claims priority from U.S. Provisional Application Ser. No. 60/374,886, filed Apr. 22, 2002, U.S. Provisional Application Ser. No. 60/374,935, filed Apr. 22, 2002, U.S. Provisional Application Ser. No. 60/374,934, filed Apr. 22, 2002, U.S. Provisional Application Ser. No. 60/374,981, filed Apr. 22, 2002, U.S. Provisional Application Ser. No. 60/374,933, filed Apr. 22, 2002, the entire contents of which are incorporated herein by reference.

STATEMENT REGARDING FEDERALLY SPONSORED RESEARCH OR DEVELOPMENT

This invention was made with Government support under Contract No. CCR-0105612, awarded by the National Science Foundation, and Contract No. DAAD19 01-2-0011 (University of Delaware Subcontract No. 497420) awarded by the U.S. Army. The Government may have certain rights in this invention.

TECHNICAL FIELD

The invention relates to communication systems and, more particularly, transmitters and receivers for use in wireless communication systems.

BACKGROUND

Broadband wireless communications call for high data-rate and high performance. Temporal channel variations and time-selective fading, however, may result in lower data-rate and an overall decrease in system performance. Time-selectivity may arise for a variety of reasons, such as oscillator drifts, phase noise, multipath propagation, and relative motion between the transmitter and the receiver. Therefore, it is important for broadband wireless applications to design single- or multi-antenna systems that account for time-varying channels.

SUMMARY

In general, space-time doppler (STDO) coding techniques are described for time-selective channels. In particular, the described STDO coded system is capable of achieving a maximum Doppler diversity for time-selective frequency-flat channels.

As demonstrated herein, this maximum diversity may be represented as Q+1, where Q is the number of bases in a generalized Basis Expansion Model (BEM) for time-frequency selective channels. In addition, linearly precoded transmissions are described to collect this maximum diversity gain.

The STDO coded design utilizes knowledge of a maximum Doppler spread at the transmitter. For exemplary purposes, three STDO codes are described. Each is capable of collecting the maximum STDO diversity. In addition, each offers a uniquely desirable tradeoff among: high spectral efficiency, low decoding complexity, and high coding gain.

The first STDO codec comprises a digital phase sweeping (DPS) scheme that renders the set of time-selective fading multi-antenna channels mathematically equivalent to a single combined channel offering the maximum joint STDO diversity. The other two STDO codecs are block orthogonal designs, and emerge from a simple but neat duality property that we establish between the time-selectively captured by the BEM, and the frequency-selectivity that can be approximated well by a finite impulse response (FIR) tapped delay line model. This duality property underpins the transformation of ST designs for single- and multi-carrier transmissions over frequency-selective channels to our time-selective channels parameterized by the BEM.

In one embodiment, a wireless communication device comprises a first coder, a second coder, and an antenna. The first coder linearly precodes a data stream to produce a precoded data stream. The second coder processes the precoded data stream in accordance with a doppler spread of time-selective communication channels to produce a transformed data stream. The antenna outputs a waveform in accordance with the transformed data stream.

In another embodiment, a wireless communication device comprises a demodulator and a decoder. The demodulator receives a waveform from a plurality of time-selective multipath communication channels and produces a demodulated data stream. The decoder decodes the demodulated data in accordance with a Basis Expansion Model (BEM) that parameterizes time-selective communication multi-path channels as a function of frequency-selective multi-path communication channels.

In another embodiment, a method comprises estimating a doppler spread for a plurality of channels from a transmitter to a receiver, and applying a linear precoder to a data stream to form a precoded data stream. The method further comprises processing the precoded data stream in accordance with the doppler spread to produce a transformed data stream; and transmitting a waveform with an antenna in accordance with the transformed data stream.

In another embodiment, a computer-readable medium comprises instructions to cause a programmable processor to estimate a doppler spread for a plurality of channels from a transmitter to a receiver, and apply a linear precoder to a data stream to form a precoded data stream. The instructions further cause the processor to process the precoded data stream in accordance with the doppler spread to produce a transformed data stream, and transmit a waveform with an antenna in accordance with the transformed data stream.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
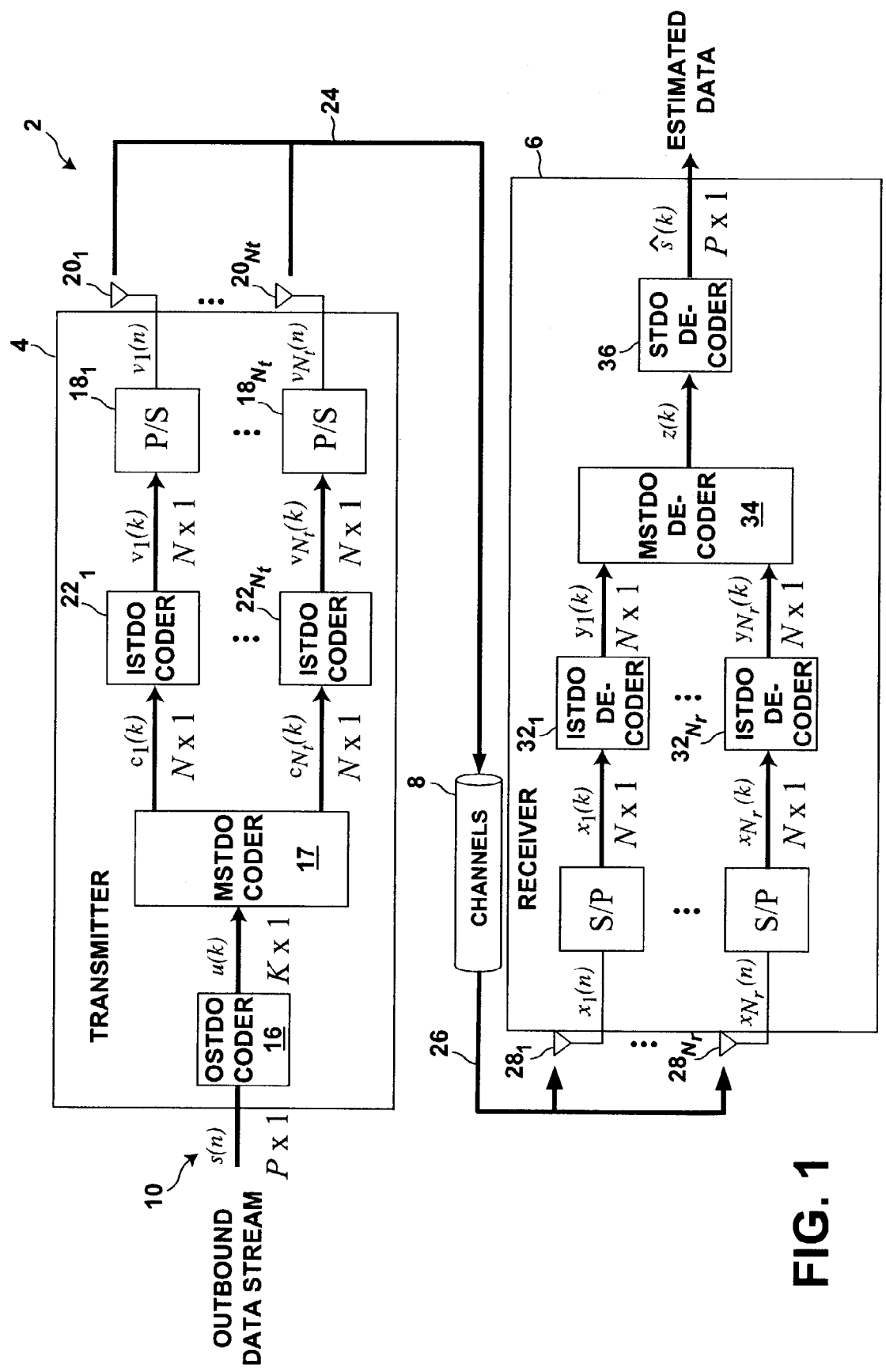
FIG. 1 is a block diagram illustrating an exemplary telecommunication system in which a transmitter and receiver implement the space-time Doppler (STDO) coding techniques described herein.

FIG. 1 is a block diagram illustrating a telecommunication system 2 in which transmitter 4 communicates data to receiver 6 through wireless channels 8. In general, transmitter 4 employs space-time doppler (STDO) coding techniques to achieve a maximum doppler diversity for time-selective channels 8.

Transmitter 4 includes a plurality of antennas $20_1$-$20_{Nt}$ for transmitting data to receiver 6. In particular, each antenna 20 outputs a waveform that propagates to receiver 6 through one or more multi-path communication channels. Transmitter 4 may output the waveforms using one of a number of conventional multi-user transmission formats, including Code Division Multiple Access (CDMA) and Orthogonal Frequency Division Multiplexing (OFDM). The former is an example of single-carrier multiple access scheme, while the latter is a multi-carrier scheme. OFDM has been adopted by many standards including digital audio and video broadcasting (DAB, DVB) in Europe and high-speed digital subscriber lines (DSL) in the United States. OFDM has also been proposed for local area mobile wireless broadband standards including IEEE802.11a, IEEE802.11g, MMAC and HIPERLAN/2.

The techniques described herein may be applied to uplink and/or downlink transmissions, i.e., transmissions from a base station to a mobile device and vice versa. Consequently, transmitters 4 and receivers 6 may be any device configured to communicate using a multi-user wireless transmission including a cellular distribution station, a hub for a wireless local area network, a cellular phone, a laptop or handheld computing device, a personal digital assistant (PDA), and the like.

As illustrated, transmitter 4 includes an outer space-time linear coder (OSTDO coder) 16, a middle space-time doppler coder (MSTDO coder) 17, a set of inner space-time doppler coders (ISTDO coder) 22, a plurality of parallel-to-serial (P/S) converters $18_1$-$18_{Nt}$, and a plurality of transmit antennas $20_1$-$20_{Nt}$. Receiver 6 includes a plurality of receive antennas $28_1$-$28_{Nr}$, a plurality of inner space-time decoders (ISTDO coder) $32_1$-$32_{Nr}$, a middle space-time doppler coder (MSTDO coder) 34, and an outer space-time doppler coder (STDO coder) decoder 36.

Channels 8 experience multipath propagation, i.e., a number of reflected or scattered rays arrive at the receiving end. Time-selectivity arises when all the rays arrive at the receiver almost simultaneously with a common propagation delay that can be set to zero without loss of generality. Let h(t) denote the time-varying impulse response of the resulting channel that includes transmit-receive filters as well as time-selective propagation effects; and let H(f) denote the Fourier transform of h(t). Although the bandwidth of h(t) over a finite time horizon is theoretically infinite, we practically have that $H(f) \approx 0$ for $f \notin [-f_{max}, f_{max}]$, where $f_{max}$ is the maximum frequency offset (Doppler shift) of all the rays. Considering that a block of N symbols with symbol period $T_s$ is time-limited, we sample H(f) along f with period $1/(NT_s)$, and collect Q+1 samples $$\{H(q/(NT_s))\}_{q=-Q/2}^{Q/2},$$

where $Q := 2\lceil f_{max} T_s N \rceil$. Transforming these frequency-domain samples back to the time-domain and sampling along the time t, we obtain samples h(n). Using the serial index n, we can describe the block index as $\lfloor n/N \rfloor$ and write our discrete-time baseband equivalent channel model as:

$$h(n) = \sum_{q=0}^{Q} h_q(\lfloor n/N \rfloor) e^{j\omega_q (n \bmod N)}, \quad (1)$$

where $\omega_q := 2\pi(q-Q/2)/N$. Eq. (1) constitutes our Basis Expansion Model (BEM). Over each interval, say the kth (k:=$\lfloor n/N \rfloor$), the BEM represents h(t) for $t \in [kNT_s, (k+1)NT_s)$ using:

a) Q+1 coefficients $\{h_q(k)\}_{q=0}^{Q}$ that remain invariant per block, but are allowed to change with k; and, b) Q+1 Fourier bases that capture even rapid time variations, but are common $\forall k$.

The complex exponential bases allow h(n) to vary not only across blocks, but also within every block. Notice also that the only physical parameter dictating the BEM order Q is the Doppler spread $f_{max}$, since N and $T_s$ in $Q := 2\lceil f_{max} N T_s \rceil$ are up to the designer's choice. The information bearing symbols $\{s(n)\}$ are drawn from a finite alphabet $A_s$, and parsed into blocks of size $P \times 1$: $s(k) := [s(kP), \ldots, s((k+1)P-1)]^T$. Each block s(k) is linearly precoded by the $K \times P$ matrix $\Theta$, resulting into $u(k) := \Theta s(k)$. This operation will be termed the outer Space-Time-Doppler (STDO) coding. Each block u(k) is further transformed into $N_t$ blocks $\{c_\mu(k)\}_{\mu=1}^{N_t}$ of size $N \times 1$ by a mapper $M(-) : \{c_\mu(k)\}_{\mu=1}^{N_t} : M(u(k))$. This operation will be termed the middle STDO coding. Each block $c_\mu(k)$ is finally linearly processed by the $N \times N$ matrix $\Phi_\mu$, resulting into $v_\mu(k) := \Phi_\mu c_\mu(k)$. This operation will be termed the inner STDO coding. Not all specific STDO designs will relay on all three (outer, middle, inner) stages of our unifying structure. If one, e.g., the inner stage is inactive, we will simply set $\Phi_\mu = I_\mu$.

The sequence $v_\mu(n)$ obtained by serial-to-parallel converting the blocks $\{v_\mu(k)\}$ is then pulse-shaped, carrier modulated, and transmitted from the µth antenna's receiver-filter output is:

$$x_\mu(n) = \sum_{\mu=1}^{N_t} h^{[\nu,\mu]}(n) v_\mu(n) + \zeta_\nu(n), \forall \nu \in [1, N_r], \quad (2)$$

where $h^{(\nu,\mu)}(n)$ is the time-selective channel response from the µth transmit-antenna to the νth receive-antenna (notice the channel dependence on n), and $\zeta_\nu(n)$ is complex additive white Gaussian noise (AWGN) at the νth receive-antenna with mean zero, and variance $\sigma_\zeta^2 = N_0$. According to (1), we have $\forall \nu \in [1, N_r], \mu \in [1, N_t]$ $$h^{[\nu,\mu]}(n) := \sum_{q=0}^{Q} h_q^{(\nu,\mu)}(\lfloor n/N \rfloor) e^{j\omega_q(n \bmod N)},$$

where $\omega_q := 2\pi(q-Q/2)/N$, and $Q:2\lceil f_{max} N T_s \rceil$ as in (1).

At each receive-antenna, the symbol rate sampled sequence $\chi_\nu(i)$ at the receive-filter output is serial-to-parallel converted to from the $N \times 1$ blocks $x_\nu(k) := [\chi_\nu(kN), \chi_\mu(kN+1), \ldots, \chi_\nu(kN+N-1)]^T$. The matrix-vector counterpart of (2) can then be expressed as:

$$x_\nu(k) = \sum_{\mu=1}^{N_t} D_H^{[\nu,\mu]}(k)v_\mu(k) + \zeta_\nu(k), \forall \nu \in [1, N_r], \quad (3)$$

where $D_H^{(\nu,\mu)}(k)$ is an N×N diagonal channel matrix that obeys the BEM $$D_H^{[\nu,\mu]}(k) := \sum_{q=0}^{Q} h_q^{(\nu,\mu)}(k)D_q, \quad (4)$$

with $D_q:=\text{diag}[1, \exp(j\omega_q), \ldots, \exp(j\omega_q(N-1))]$, and $\zeta_\nu(k)$'s independent identically distributed (i.i.d.) AWGN noise vectors, which are defined similar to $x_\nu(k)$. Each block $x_\nu(k)$ is linearly processed by the N×N matrix $\Gamma_\nu$ to yield $y_\nu(k):=\Gamma_\nu x_\nu(k)$. This operation is termed the inner STDO decoding. The blocks $y_\nu(k)$ are further "de-mapped" to a block $z(k)$, by $\overline{M}(\bullet):z(k):=\overline{M}(\{y_\nu(k)\}_{\nu=1}^{N_r})$. This operation is termed the middle STDO decoding. The block $z(k)$ is finally decoded by $G(\bullet)$ to obtain an estimate of $s(k)$ as: $\hat{s}(k):=G(z(k))$. This operation is termed the outer STDO decoding.

The following operating conditions are assumed for system 2:

A2) BEM coefficients $h_q^{(\nu,\mu)}$ are zero-mean, complex Gaussian random variables;

A3) Channel state information (CSI) is available at the receiver, but unknown at the transmitter;

A4) High SNR is considered for deriving the STDO diversity and coding gains.

When transmissions experience rich scattering, and no line-of-sight is present, the central limit theorem validates A2). Notice that we allow not only for independent random channel coefficients, but also for correlated ones.

Pairwise error probability (PEP) to design our opti-mality criteria. Define the PEP $P(s \rightarrow s'|D_H^{(\nu,\mu)}, \forall \nu, \mu)$ as the probability that maximum likelihood (ML) decoding of s erroneously decides s' instead of the actually transmitted s.

As $x_\nu$ in (3) depends on s, we will use ML decoding to detect s from $\{x_\nu\}_{\nu=1}^{N_r}$. Conditioned on the $D_H^{(\nu,\mu)}$'s, the Chernoff bound yields:

$$P(s \rightarrow s' \mid D_H^{[\nu,\mu]}, \forall \nu, \mu) \leq \exp\left(-\frac{d^2(\tilde{x}, \tilde{x}')}{4N_0}\right), \quad (5)$$

where $\tilde{x}:=[(\Sigma_{\mu=1}^{N_t}D_H^{(1,\mu)}v_\mu)^T, \ldots, (\Sigma_{\mu=1}^{N_t}D_H^{(N_r,\mu)}v_\mu)^T]^T$, the distance in the exponent is $$d^2(\tilde{x}, \tilde{x}') = \sum_{\nu=1}^{N_r}\left\|\sum_{\mu=1}^{N_t}D_H^{[\nu,\mu]}e_\mu\right\|^2,$$

and $e_\mu:=v_\mu-v'_\mu$. Based on (4), and using the commutativity between a diagonal matrix and a vector we can write $D_H^{(\nu,\mu)}e_\mu=D_e^{(\mu)}d_H^{(\nu,\mu)}$, with $D_e^{(\mu)}:=\text{diag}[e_\mu], d_H^{(\nu,\mu)}:= \Sigma_{q=0}^{Q}h_q^{(\nu,\mu)}\omega_q$, and $\omega_q:=[1, \exp(j\omega_q), \ldots, \exp(j\omega_q(N-1))]^T$. With these definitions, we can rewrite $d^2(\tilde{x}, \tilde{x}')$ as:

$$d^2(\tilde{x},\tilde{x}')=h^H A_e h$$

where $h:=[h_0^{(1,1)}, \ldots, h_Q^{(1,1)}, \ldots, h_Q^{(1,N_t)}, \ldots, h_Q^{(N_r,N_t)}]^T$, $N_r N_t(Q+1)$ $A_e:=I_{N_r} \otimes (\Phi_e^H \Phi_e), N_r N_t(Q+1) \times N_r N_t(Q+1)$ $\Phi_e:=[D_e^{(1)}\Omega, \ldots, D_e^{(N_t)}], N \times N_t(Q+1)$ $$\Omega:=[\omega_0, \ldots, \omega_Q]N \times (Q+1) \quad (6)$$

Since our analysis will allow for correlated channels, we will denote the $N_r N_t(Q+1) \times N_r N_t(Q+1)$ channel correlation matrix and its rank, respectively by:

$$R_h:=E[hh^H], \text{ and } r_h:=\text{rank}(R_h) \leq N_r N_t(Q+1), \quad (7)$$

Eigenvalue decomposition of $R_h$ yields $R_h=U_h \Lambda_h U_h^H$, where $\Lambda_h:=\text{diag}[\sigma_0^2, \ldots, \sigma_{r_h-1}^2]$, and $U_h$ is an $N_r N_t(Q+1) \times r_h$ para-unitary matrix satisfying $U_h^H U_h=I_{r_h}$. Define an $r_h \times 1$ normalized channel vector $\bar{h}$ with entries $\bar{h}_q^{(\nu,\mu)}$ are that i.i.d. Gaussian distributed, with zero mean and unit variance. It is easy to show that h and $U_h \Lambda_h^{1/2}\bar{h}$ have identical distributions. Therefore, the PEP remains statistically invariant when one replaces h by $U_h \Lambda_h^{1/2}\bar{h}$. To proceed, let us define the $r_h \times r_h$ matrix:

$$\Psi_e:=(U_h \Lambda_h^{1/2})^H A_e U_h \Lambda_h^{1/2}. \quad (8)$$

Since $\Psi_e$ is Hermitian, there exists a unitary matrix $U_e$ and a real non-negative definite diagonal matrix $\Lambda_e$ so that $U_e^H \Psi_e U_e=\Lambda_e$. The $r_h \times r_h$ diagonal matrix $\Lambda_e:=\text{diag}[\lambda_0 \ldots, \lambda_{r_h-1}]$, hold on its diagonal the eigenvalues of $\Psi_e$ that satisfy $\lambda_m \geq 0, \forall m \in [0, r_h-1]$. The vector $\tilde{h}=U_e \bar{h}$ has the same distribution as $\bar{h}$, because $U_e$ is unitary. Thus, $d^2(\tilde{x},\tilde{x}')$ can be rewritted in terms of the eigenvalues of the matrix $\Psi_e$ as $$d^2(\tilde{x}, \tilde{x}') = \sum_{m=0}^{r_h-1}\lambda_m|\tilde{h}_m|^2. \quad (9)$$

Since we wish our STDO coders to be independent of the particular channel realization, it is appropriate to average the PEP over the independent Rayleigh distributed $|\tilde{h}_m|^2$'s. If $r_e:=\text{rank}(\Psi_e)$, then $r_e$ eigenvalues of $\Psi_e$ are non-zero; without loss of genearality, we denote these eigenvalues as $\lambda_0 \geq \ldots \geq \lambda_{r_e-1}$. At high SNR, the resulting average PEP is bounded as follows [c.f. (5)]:

$$P(s \rightarrow s') \leq \prod_{m=0}^{r_e-1}\left(\frac{\lambda_m}{4N_0}\right)^{-1} = \left(G_{e,c}\frac{1}{4N_0}\right)^{-G_{e,d}}, \quad (10)$$

where $G_{e,d}:=r_e$ is the diversity order, and $G_{e,c}^H=(\Pi_{m=0}^{r_e-1}\lambda_m)^{1/r_e}$ is the coding gain for the error pattern e:=s-s'. Accounting for all possible pairwise errors, the diversity and coding gains for our STDO multi-antenna systems are defined, respectively, as:

$$G_d := \min_{\forall e \neq 0} G_{e,d}, \text{ and } G_c := \min_{\forall e \neq 0} G_{e,c}. \tag{11}$$

Because the performance of STDO depends on both $G_d$ and $G_c$, it is important to maximize both of them. But before specializing to particular STDO designs that accomplish this, we wish to quantify the maximum possible $G_d$ and $G_c$ supplied by our BEM.

Eq. (10) discloses that $G_d$ depends on the r and $r_e$ of $\Psi_e$. As the rank can not exceed the dimensionality, checking the dimensionality of $\Psi_e$, we recognize that by appropriately designing our transmissions, it is possible to achieve a maximum (and thus optimum) diversity gain $$G_d^{\max} = r_h \leq N_t N_r (Q+1), \tag{12}$$

if and only if the matrix $\Psi_e$ in (8) has full rank $r_h$, $\forall e \neq 0$.

Eq. (10) also indicates that $G_{e,c}$ is the product of the non-zero eigenvalues of $\Psi_e$. It is not easy however, to express $G_c$ in closed form. But we can benchmark it, when $R_h$ has full rank $N_r N_t (Q+1)$.

Since $R_h$ is not known at the transmitter, we will allocate the transmit-power equally to the $N_t$ sub-streams corresponding to the $N_t$ transmit-antennas. For this reason, we set $$E[v_\mu^{\mathcal{H}} v_\mu] = \frac{1}{N_t} E[s^{\mathcal{H}} s] = \frac{P}{N_t} \sigma_s^2, \tag{13}$$

where $\sigma_s^2$ is the power per information symbol. If the mapping from s to $v_\mu$ satisfies $$v_\mu = \sum_{p=0}^{P-1} a_p^{(\mu)} [s]_p + b_p^{(\mu)} [s]_p^*, \forall \mu \in [1, N_t], \tag{14}$$

where $a_p^{(\mu)}$ and $b_p^{(\mu)}$ are N×1 vectors, then we call ST transmitter a linearly coded one.

$$G_c^{\max} = (\det(R_h))^{\frac{1}{r_h}} \frac{d_{\min}^2}{N_t}, \tag{15}$$

where $d_{min}$ is the minimum Euclidean distance of the constellation points in the finite alphabet $A_s$.

In deriving performance bounds, we have assumed ML decoding which comes with high computational complexity. Therefore, when we design the STDO encoders to guarantee the maximum diversity order, we will keep in mind the need to reduce decoding complexity while preserving the optimality in decoding. Before we proceed to design STDO coders, we summarize our results so far in the following proposition:

Proposition 1 Consider $(N_t, N_r)$ multi-antenna transmissions through time-selective channels adhering to a BEM as in (1) with Q+1 bases. If the correlation matrix of the channel coefficients in (6) has rank $r_h$, then the maximum diversity order of transmissions in (3) is $$G_c^{\max} = (\det(R_h))^{\frac{1}{r_h}} d_{\min}^2 / N_t.$$

For linearly coded systems, if $R_h$ has full rank $r_h = N_r N_t (Q+1)$, then the maximum coding gain is $$G_d^{\max} = r_h \leq N_t N_r (Q+1).$$

For the DPS method, the middle STDO encoder M(•) is just a power splitter (see FIG. 1). By equally allocating the signal power, we obtain $c_\mu = u/\sqrt{N_t}$, $\forall \mu \in [1, N_t]$. This means that for DPS we have K=N. Using (3), $x_v$ and s can then be related via:

$$x_v = \frac{1}{\sqrt{N_t}} \sum_{\mu=1}^{N_t} D_H^{(v,\mu)} \Phi_\mu \Theta s + \zeta_v, \ v \in [1, N_r]. \tag{16}$$

Figure 2:
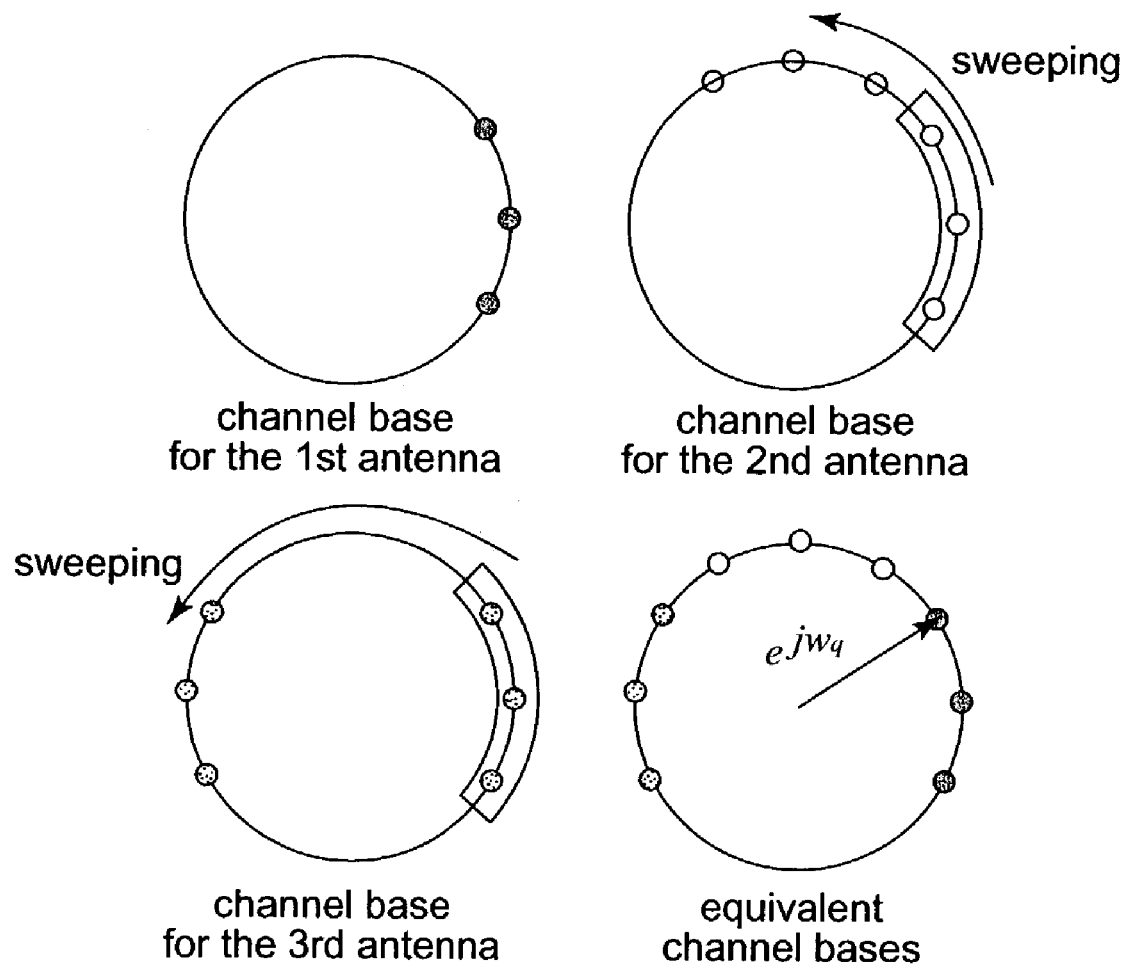
FIG. 2 illustrates digital phase sweeping (DPS) techniques.

Observing (4), we notice that different channels share the same exponential bases, but they have different channel coefficients. Suppose that we shift the Q+1 bases of each channel corresponding to one of the $N_t$ transmit antennas so that all the bases are consecutive on the FFT grid of complex exponentials, as shown in FIG. 2 for $Q+1=N_t=3$. Then we can view the $N_t$ channels to each receive-antenna as one equivalent time-selective channel with $N_t(Q+1)$ bases. To realize this intuition, we select the matrices $\{\Phi_\mu\}_{\mu=1}^{N_t}$, which determine the inner STDO encoder, as $$\Phi_\mu = \text{diag}[1, e^{j\phi_\mu}, \ldots, e^{j\phi_\mu(N-1)}], \forall \mu \in [1, N_t], \tag{17}$$

where $\phi_\mu = 2\pi(\mu-1)(Q+1)/N$. As $\Phi_1 = I$, the exponentials of the channel corresponding to the first ($\mu=1$) transmit antenna remain unchanged. But those corresponding to the second channel ($\mu=2$) are shifted from their original location in $$\{D_q\}_{q=0}^{Q} \text{ to } \{D_q\}_{q=Q+1}^{2Q+1},$$

after multiplication with DPS matrix $\Phi_2$ that takes place at the second transmit-antenna; i.e., $$\{D_q \Phi_2\}_{q=0}^{Q} = \{D_q\}_{q=Q+1}^{2Q+1}.$$

Proceeding likewise with all $N_t$ DPS matrices, it follows that Eq. (16) can be rewritten as $$x_v = \frac{1}{\sqrt{N_t}} \sum_{q=0}^{N_t(Q+1)-1} h_q^{(v)} D_q \Theta s + \zeta_v, \ \forall v \in [1, N_r], \tag{18}$$

where $$h_q^{(v)} := h_{q \bmod (Q+1)}^{(v, \lfloor q/(Q+1) \rfloor + 1)}.$$

Comparing (16) with (18), we arrive at:

Property 1: DPS converts the $N_t$ transmit-antenna system, where each channel can be expressed via Q+1 exponential bases, to a single transmit-antenna system, where the equivalent channel is expressed by $N_t(Q+1)$ exponential bases.

Notice that since $\Phi_\mu$ operates in the digital domain, the sweeping wraps the phases around $[-\pi, \pi)$, which explains why DPS does not incur bandwidth expansion.

Remark 1 To avoid overlapping the shifted bases, we should make sure that $N)N_t(Q+1)$. From the definition of $Q:=2\lceil f_{max}NT_s \rceil$, we have that for fixed $f_{max}$ and $N$ symbols, this condition guarantees that the number of unknowns is less than the number equations. Therefore, even from a channel estimation point of view, this condition is reasonable.

With the equivalence established by Property 1, our outer STDO codec, which is determined by $\Theta$ and $G(\cdot)$, can be any single-input codec that achieves the maximum diversity gain for the single transmit-antenna time-selective channels corresponding to each receive-antenna. From [16, Proposition 2], we know that ML decoding by means of $G(\cdot)$ achieves the maximum diversity gain $r_h$ if the linear precoder $\Phi$ is designated in such a way that $\Phi_e$ has at least $N_t(Q+1)$ non-zero entries, for all possible error vectors $e=s-s'\neq 0$. However, as $N_t$ increases, the block length $N$ increases as well (see Remark 1). ML decoding fro the entire $N\times 1$ block entails high computational complexity. To reduce the decoding complexity, we will split the design of the outer STDO encoder $\Theta$ in groups of smaller size. In particular, we design $\Theta$ using a Grouped Linear Constellation Precoding (GLCP) scheme described in U.S. Provisional Application Ser. No. 60/374,935, entitled "LINEAR CONSTELLATION PRECODING FOR FADING COMMUNICATION CHANNELS," filed Apr. 22, 2002, and U.S. patent application Ser. No. 10/420,353, filed Apr. 21, 2003, entitled "WIRELESS COMMUNICATION SYSTEM HAVING LINEAR ENCODER," the entire contents of which are incorporated herein by reference. GLCP provides a means of reducing decoding complexity without sacrificing diversity. Here, we design the outer STDO coder 16 based on the BEM for time-selective channels described herein. In particular, we select the transmitted block size $N=N_R N_{sub}$, and demultiplex the information vector $s$ into $N_g$ groups: $\{s_g\}_{g=0}^{N_g-1}$. Each group has length $N_{sub}$, and contains the symbols collected in a vector $s_g$ as follows:

$$s_g=[[s]_{N_{sub}g}, \ldots, [s]_{N^{sub}(g+1)-1}]^T, \forall g\in[0,N_g-1]. \quad (19)$$

Correspondingly, we define the linearly procoded block of the gth group as:

$$u_g=\Theta_{sub}s_g, \forall g\in[0,N_g-1], \quad (20)$$

where $\Theta_{sub}$ is an $N_{sub}\times N_{sub}$ matrix. To enable the maximum diversity, we select $\Theta_{sub}$ from the algebraic designs of [24]. The overall transmitted block $u$ consists of multiplexed sub-blocks $\{u_g\}_{g=0}^{N_g-1}$ as follows:

$$u=[[u_0]_0, \ldots, [u_{N_g-1}]_0; \ldots; [u_0]_{N_{sub}-1}, \ldots, [u_{N_g-1}]_{N_{sub}-1}]^T. \quad (21)$$

Notice that $u$ can be obtained from $\{u_g\}_{g=0}^{N_g-1}$'s via a block interleaver with depth $N_{sub}$. Equivalently, we can relate $u$ with $s$ as $$u = \Theta s, \text{ with } \Theta := \begin{bmatrix} I_{N_g} \otimes \theta_1^T \\ \vdots \\ I_{N_g} \otimes \theta_{N_{sub}}^T \end{bmatrix}, \quad (22)$$

where $\theta_m^T$ is the mth row of $\Theta_{sub}$. Equations (19)-(21), or equivalently (22), summarize our STDO transmitter design based on DPS.

Following the "reverse order" of DPS encoding, we start from the inner decoder. The inner decoder for the vth receive antenna is designed as $T_v=I_N, \forall v\in[1,N_r]$. Hence, in the unifying block-diagram of FIG. 1, we have $y_v=x_v, \forall v\in[1,N_r]$. Let us denote the equivalent faster single transmit-antenna channel matrix as:

$$D_H^{(v)} = \sum_{q=0}^{N_t(Q+1)-1} h_q^{(v)} D_q, \quad \forall v \in [1, N_r]. \quad (23)$$

Since the received blocks $y_v$ from all $N_r$ receive-antennas contain the information block $s$, we need to combine the information from all received blocks to decode $s$. To retain decoding optimality, we choose the maximum ratio combining (MRC) method. The MRC for $x_v=y_v$ in (18), amounts to selecting the middle decoder $\overline{M}(\cdot)$ as [c.f. (23)]

$$G = \left(\sum_{v=1}^{N_r} D_H^{(v)}(D_H^{(v)})^*\right)^{-\frac{1}{2}} [(D_H^{(1)})^* \ldots (D_H^{(N_r)})^*]. \quad (24)$$

Existence of the inverse in (24), requires (only for the DPS design) the channels to satisfy:

$$\text{Channels } D_H^{(v)} \text{ are coprime; i.e., } \det\left(\sum_{v=1}^{N_r} D_H^{(v)}(D_H^{(v)})^*\right) \neq 0. \quad \text{A5)}$$

Assumption A5) is more technical rather than restrictive, since it requires that not all equivalent channels are identically zero at the same time slot. For random channels, A5) excludes an event with probability measure zero.

With the MRC of (24), the output $z$ of $\overline{M}(\cdot)$, is given by:

$$z = G \begin{bmatrix} y_1 \\ \vdots \\ y_{N_r} \end{bmatrix} = \frac{1}{\sqrt{N_t}} \left(\sum_{v=1}^{N_r} D_H^{(v)}(D_H^{(v)})^*\right)^{\frac{1}{2}} \Theta s + \eta, \quad (25)$$

where $\eta:=G[\zeta_1^T, \ldots, \zeta_{N_r}^T]^T$. Thanks to A5), it can be verified that $G$ satisfies $GG^H=I$. Since the $\zeta_v$'s are i.i.d. AWGN noise vectors, the noise vector $\eta$ retains their whiteness. Following MRC, we split $z$ into $N_g$ groups:

$$z_g = \frac{1}{\sqrt{N_t}} D_{H,g} \Theta_{sub} s_g + \eta_g, \quad \forall g \in [0, N_g - 1], \quad (26)$$

where $z_g:=[[z]_g, [z]_{N_{sub}+g}, \ldots, [z]_{N_{sub}(N_g-1)+g}]^T$, $D_{H,g}$ is the corresponding diagonal sub-matrix from $$\left(\sum_{v=1}^{N_r} D_H^{(v)}(D_H^{(v)})^*\right)^{\frac{1}{2}}$$ (5)

for the gth group; and similarly defined, $\eta_g$ is the corresponding AWGN noise vector.

Maximum likelihood (ML) decoding can, for example, be implemented by applying a Sphere Decoding (SD) algorithm of sub-blocks $z_g$ of small size $N_{sub}$. Compared to the exponentially complex ML decoder, the SD offers near-ML performance at complexity that is polynomial in $N_{sub}$, O$(N_{sub}^\alpha)$. The SD complexity depends on the block size $N_{sub}$, but unlike ML, it is independent of the constellation size.

Figure 2A:
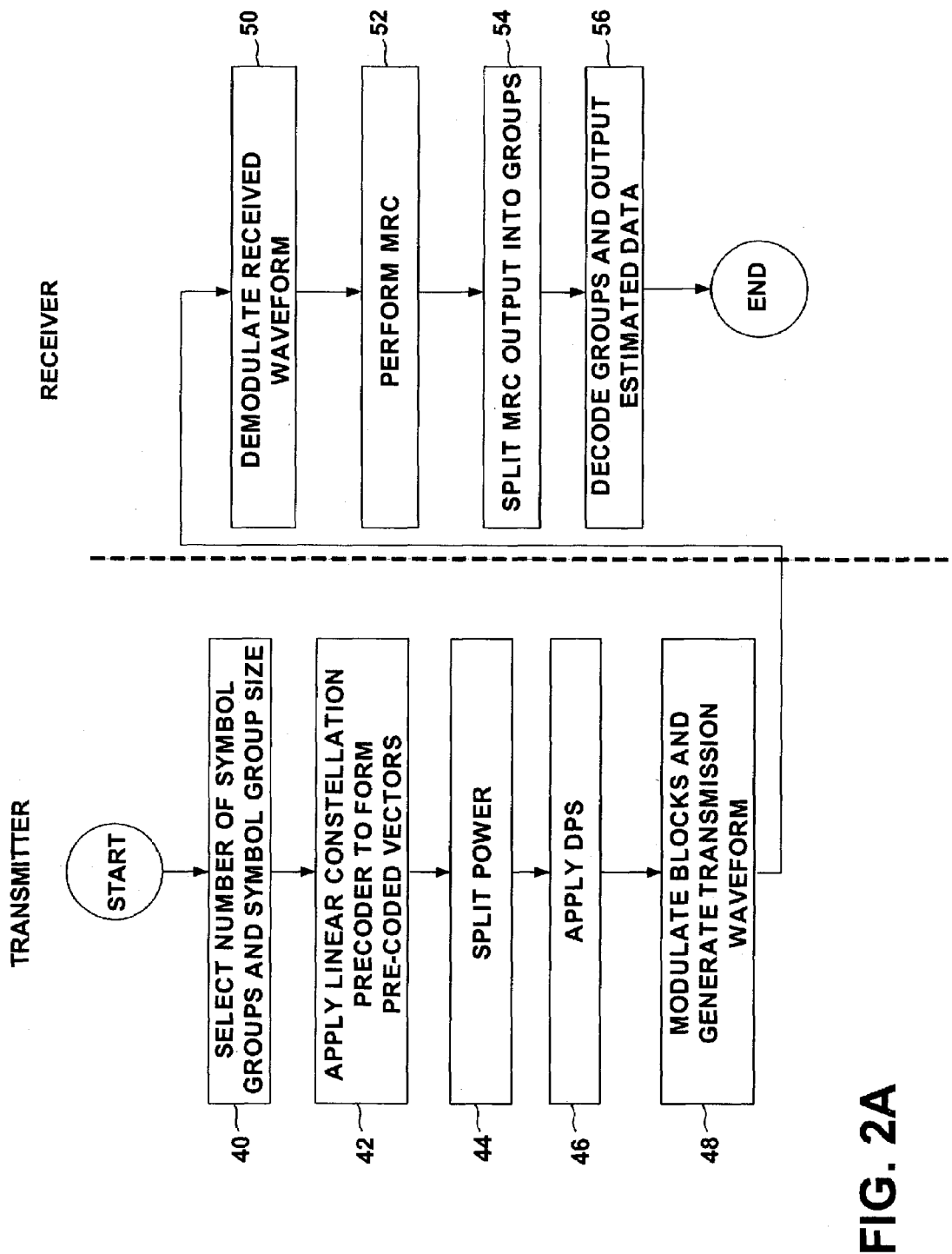
FIG. 2A is a flowchart that illustrates exemplary operation of the transmitter and receiver of FIG. 1.
Figure 3:
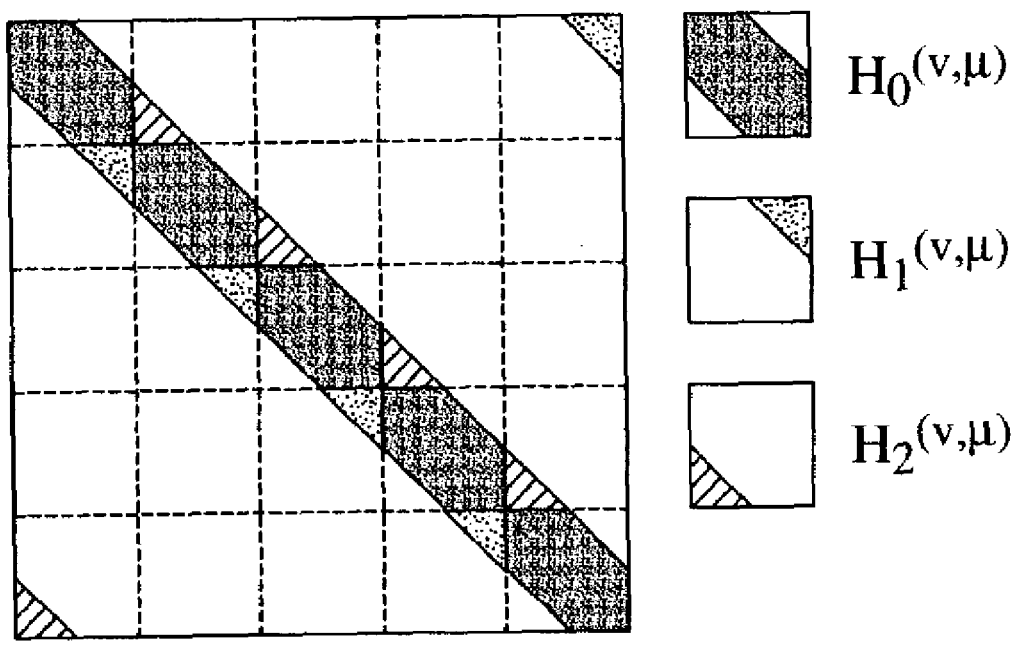
FIG. 3 illustrates channel matrix partitioning.

FIG. 2A is a flowchart that illustrates operation of the DPS-based space-time multipath techniques describe herein. For exemplary purposes, the operation is described in reference to FIG. 1.

Given $N_t$, $N_r$, and Q, transmitter 4 selects the number of groups $N_g$, and the corresponding group size $N_{sub}$ depending on affordable complexity; and selects $N=P=K=N_g N_{sub} > N_t$ (Q+1) (step 40).

Outer (OSTDO) coder 16 applies the $N_{sub} \times N_{sub}$ linear constellation precoder $\Theta_{sub}$ to form a precoded data stream, i.e., the precoded vectors u, according to equations (19)-(21) (step 42). Middle STDO (MSTDO) coder 17 splits the power of u to form mirrored precoded data streams $c_\mu = u/\sqrt{N_t}$ (step 44).

Inner STDO coders 22 apply DPS via $\Phi_\mu$, and transmit $v_\mu = \Phi_\mu c_\mu$, $\forall \mu \in [1, N_t]$ (step 46). In particular, transmitter 4 has the knowledge of the upper-bound of the number of bases for the time-varying channels from transmitter 4 to receiver 6. ISTDO coders 22 process the precoded data streams so that the channels from transmitter 4 to receiver 6 can be equivalently viewed as one channel with more bases. In particular, ISTDO coders 22 compute a single channel vector from doppler offsets for the channels, and processes the mirrored precoded data streams with the single channel vector to shift the delay lag of each of the channels so that channel taps become consecutive within a Fast Fourier Transform (FFT) grid. Finally, transmitter 4 modulates each block $v_\mu$ to produce a transmission waveform via transmission antennas 20 (step 48).

Receiver 6 receives a waveform via receive antennas 28, and demodulates the received waveform (step 50). Next, receiver 6 performs MRC of blocks from all of the receive antennas 28 as in equation (25) (step 52). Finally, receiver 6 splits the MRC output block into Ng groups (step 64), and implements a scheme, e.g., ML or Sphere, to decode each reduced size group as in equation (26) to provide the estimated data (step 56). The performance of system 2 is a function of the sub-block size $N_{sub}$, and when $N_{sub} \geq r_h$, the maximum diversity order in (12) is achieved. However, when $N_{sub} < r_h$, the achieved diversity order is $N_{sub}$.

The diversity gain for the STDO techniques described herein can be summarized in the following proposition:

Proposition 2 The maximum achievable STDO diversity order $G_d = r_h$ is guaranteed by our DPS design when the group size is selected as $N_{sub} \sqrt[3]{N_t(Q+1)}$. When the channel correlation matrix $R_h$ has full rank $r_h = N_r N_t(Q+1)$, our DPS design enables also the maximum possible coding gain among all linearly coded transmissions that is given in closed form by:

$$G_c^{max} = (\det(R_h))^{\frac{1}{r_h}} d_{min}^2 / N_t.$$

Transmission rate 1 symbol/sec/Hz is achieved by DPS design.

In fact, the group size $N_{sub}$ controls the tradeoff between performance and decoding complexity. When $N_{sub} \leq N_t(Q+1)$, as $N_{sub}$ decreases, the decoding complexity decreases, while at the same time, the diversity order decreases. By adjusting $N_{sub}$, we can balance the affordable complexity with the required performance.

The described DPS scheme utilizes channel knowledge at the receiver. As described DPS converts the multi-input single output (MISO) channel corresponding to each receive-antenna to an equivalent single-input single-output (SISO) system. As a result, existing SISO training algorithms can be utilized with the described techniques. The following describes a PSAM training method that may be used with the described GLCP-DPS transmission.

Initially, the BEM coefficients are estimated per block of N symbols. Starting from (19), we select one group $s_g$ to serve as the pilot group. Without loss of generality, we select this group to be the first on, and design it as:

$$s_0 = [b, b, \ldots, b]_{N_{sub} \times 1}^T.$$ (27)

After precoding the remaining groups as before, and interleaving among all the groups, the transmitted block u becomes:

$$u = [b, [u_1]_0, \ldots, [u_{N_g-1}]_0; b, \ldots; b, [u_1]_{N_{sub}-1}, \ldots, [u_{N_g-1}]_{N_{sub}-1}]^T.$$ (28)

At the receive filter output, samples are collected that depend only on the pilot symbols. The resulting input-output relationship can be expressed as:

$$x_{v,b} = \frac{b}{\sqrt{N_t}} D_{H,b}^{(v)} 1 + \zeta_{v,b}, \forall v \in [1, N_r],$$ (29)

where $D_{h,b}^{(v)}$ contains the channel entries from $D_H^{(v)}$ that correspond to the pilot slots, 1 is a vector with all-ones, and $\zeta_{v,b}$ is the corresponding noise vector. Recalling (18), it can be verified that $$D_{H,b}^{(v)} 1 = \sum_{q=0}^{N_t(Q+1)-1} h_q^{(v)} \omega_{q,b} = \Omega_b h^{(v)},$$ (30)

where $\Omega_b := [\omega_{0,b} \cdots \omega_{N_t(W+1)-1,b}]$, and $\omega_{q,b} := [1, \exp(j\omega_1 N_g), \ldots, \exp(j\omega_q N_g(N_{sub}-1))]^T$. Substituting (30) into (29), we obtain $$x_{v,b} = \frac{b}{\sqrt{N_t}} \Omega_b h^{(v)} + \zeta_{v,b}, \forall v \in [1, N_r].$$ (31)

The linear minimum mean square error (LMMSE) channel estimator for the vth receive-antenna is:

$$\hat{h}^{(v)} = \frac{b^*}{\sigma_\zeta^2 \sqrt{N_t}} \left( R_{h^{(v)}}^{-1} + \frac{|b|^2}{\sigma_\zeta^2 N_t} \Omega_b^{\mathcal{H}} \Omega_b \right)^{-1} \Omega_b^{\mathcal{H}} x_{v,b}, \ \forall \ v \in [1, N_r], \quad (32)$$

And the mean square error of $\hat{h}^{(v)}$ is $$\sigma_{\hat{h}^{(v)}}^2 = tr\left( \left( R_{h^{(v)}}^{-1} + \frac{|b|^2}{\sigma_\zeta^2 N_t} \Omega_b^{\mathcal{H}} \Omega_b \right)^{-1} \right). \quad (33)$$

When $N_{sub} \geq N_t(Q+1)$, thanks to the equi-spaced placement of pilot symbols, we have $\Omega_b^H \Omega_b = N_{sub} I_{N_t(Q+1)}$. Suppose we fix the total power allocated to pilot symbols; i.e., $|b|^2 = P_b/N_{sub}$, and $P_b$ is fixed. Then (33) can be simplified to $$\sigma_{\hat{h}^{(v)}}^2 = tr\left( \left( R_{h^{(v)}}^{-1} + \frac{p_b}{\sigma_\zeta^2 N_t} I_{N_t(Q+1)} \right)^{-1} \right). \quad (34)$$

Eq. (34) confirms that the more power we allocate to pilot symbols, the more reliable our channel estimator is. For a fixed power $P_b$, as the number of transmit-antennas increases, $\sigma_{\hat{h}^{(v)}}^2$ increases. Eqs. (32) and (34) provide a reliable training-based channel estimator and its variance, that is needed for realizing our DPS-based STDP scheme. Optimizing the training design also from a capacity perspective will be one of our future topics.

In the described STDO coding scheme, inner STDO coders 22 and inner STDO decoders 32 transform the time-selective channels into frequency-selective channels, e.g., by means of FFT and IFFT operations. The middle and outer coders 17, 16, respectively, can be used to implement orthogonal space-time multipath (STDO) designs to achieve the maximum diversity, and large coding gains. The following describes the duality between our finite basis expansion model for time-selective channels, and the finite impulse response (FIR) tapped delay model for frequency-selective channels, as further described in U.S. patent application Ser. No. 10/420,352, entitled "SPACE-TIME MULTIPATH CODING SCHEMES FOR WIRELESS COMMUNICATION SYSTEMS," filed Apr. 21, 2003, the entire content of which is incorporated herein by reference.

Because circulant matrices can be diagonalized by (I)FFT matrices, and that the BEM described in (4) is based on the FFT grid, we can rewrite $D_H^{(v,\mu)}$ as:

$$D_H^{(v,\mu)} = \sum_{q=0}^{Q} h_q^{(v,\mu)} D_q = F_N H^{(v,\mu)} F_N^{\mathcal{H}}, \quad (35)$$

where $H^{(v,\mu)}$ is a circulant N×N matrix with first column $$[h_{Q/2}^{(v,\mu)} \cdots h_0^{(v,\mu)} 0 \cdots 0 \ h_Q^{(v,\mu)} \cdots h_{Q/2+1}^{(v,\mu)}]^T,$$

and $F_N$ denotes the N-point Fast Fourier Transformation (FFT) matrix with (m+1,n+1)st entry $[F_N]_{m,n}(1/\sqrt{N})e^{-j2\pi mn/N}$. If we now design the inner STDO codec in FIG. 1 as $$\Phi_\mu = F_N, \forall \mu \in [1, N_t], \text{ and } \Gamma_v = F_N^H, \forall v \in [1, N_r], \quad (36)$$

then based on (3), (35) and (36), we obtain $$y_v = F_N^{\mathcal{H}} x_v = \sum_{\mu=1}^{N_t} F_N^{\mathcal{H}} D_H^{(v,\mu)} F_N c_\mu + F_N^{\mathcal{H}} \zeta_v \quad (37)$$

$$= \sum_{\mu=1}^{N_t} H^{(v,\mu)} c_\mu + \eta_v, \ \forall \ v \in [1, N_r].$$

Equations (35)-(37) suggest that due to the described BEM, it is possible to convert the diagonal time-selective channel $D_H^{(v,\mu)}$ to a circulant matrix after IFFT and FFT operations. The Q+1 BEM coefficients are dual to the channel taps of a frequency-selective channel. Hence, the inner STDO codec of system 2 is capable of transforming multi-antenna ST time-selective channels into ST frequency-selective channels. This time-frequency duality on channel models can be summarized in the following:

Property 2: Based on the BEM in (1) for time-selective channels, a block transmission over time-selective channels can be equivalently viewed as a transmission over frequency-selective channels after FFT processing at the transmitter, and IFFT processing at the receiver. An equivalent diagonal (or circulant) channel matrix can be generated either from a time-selective, or, from a frequency-selective channel with appropriate (I)FFT operations.

In order to achieve the maximum diversity gain $r_h$, we can adopt some of the existing Space-Time-Multipath (STM) codecs as our middle and outer STDO codecs. In the following, a low-complexity CP-based approach, and a high-performance Zero Padding (ZP) based approach.

In the CP-based approach, the middle STDO codec consists of two stages. The first stage implements ST block coding, that is used to collect the spatial diversity. The second stage implements a GLCP-OFDM-based module to collect the Doppler (now viewed as multipath) diversity.

The ST block coding stage comprises an extension of the generalized complex orthogonal design (GCOD) for flat channels to time-selective channels. Consider splitting u into $N_s$ equally long sub-blocks of size $N_{sub}$ as the input of GCOD; i.e., $K = N_s N_{sub}$. Define the size of output of GCOD as: $N_d N_{sub}$. Therefore, the rate of ST block code is $N_s/N_d$. Our ST block code matrix is:

$$C_{(N_d N_{sub}) \times N_t} = \sum_{i=0}^{N_s-1} (A_i \otimes u_i + B_i \otimes u_i^*), \quad (38)$$

where $u_i := [[u]_{N_{sub}i}, \ldots, [u]_{N_{sub}(i+1)-1}]^T$, and the real matrices $\{A_i \in \mathbb{R}^{N_d \times N_t}, B_i \in \mathbb{R}^{N_d \times N_t}, \forall i \in [0, N_s-1]\}$, satisfy the following properties:

$$A_i^T A_{i'} + B_i^T B_{i'} = \frac{1}{N_i} I_{N_i} \delta(i - i') \quad (39)$$

$$A_i^T B_{i'} = 0, \ \forall \ i, i' \in [0, N_s - 1].$$

The symbols of the μth column of C are directed to the μth transmit-antenna.

Thanks to the FFT inner codec, the time-selective channel is converted to a frequency-selective channel. Dealing now with a frequency-selective channel, the second stage of our middle STDO codec forms an OFDM-based block transmission. The advantage of invoking an OFDM-structure here is two-fold: i) to cope with interblock interface (IBI) so that ST block codes can be decoded in block-form; and ii) to diagonalize the channel so that our low-complexity GLCP-based codec can be used in the outer STDO encoder.

After the first stage of ST block coding, an IFFT is performed and the CP is added to each sub-block with length $N_{sub}$. In matrix form, these operations can be described as:

$$[c_1 \ldots c_{N_t}] = \rho(I_{N_d} \otimes T_{cp})(I_{N_d} \otimes F_{N_{sub}}^H)C, \quad (40)$$

where $$\rho = \sqrt{N_{sub}/(N_{sub}+Q)}$$

is a power-normalizing constant, and $T_{cp} := [T_1, I_{N_{sub}}, T_2]^T$, is a matrix implementing the CP insertion, with $T_1 := [0_{(Q/2)\times(N_{sub}-Q/2)}, I_{Q/2}]^T$, and $T_2 := [I_{Q/2}, 0_{(Q/2)\times(N_{sub}-Q/2)}]^T$.

Correspondingly, at the receiver, we design the middle STDO decoder $\overline{M}(\cdot)$ following the reverse order of the two encoding stages. Specifically, we remove the CP and perform FFT by pre-multiplying with $(I_{N_d} \otimes F_{N_{sub}})(I_{N_d} \otimes R_{cp})$ the received block on each antenna, where $R_{cp} := \lfloor 0_{N_{sub} \times (Q/2)}, I_{N_{sub}}, 0_{N_{sub} \times (Q/2)} \rfloor$ is a matrix description of the CP removal operation. Recalling (37), and our inner codec, we infer that the equivalent channel matrix facing the middle STDO codec is a circulant matrix $H^{(v,\mu)}$. With the OFDM module, the equivalent channel becomes:

$$(I_{N_d} \otimes F_{N_{sub}})(I_{N_d} \otimes R_{cp})H^{(v,\mu)}(I_{N_d} \otimes T_{cp})(I_{N_d} \otimes F_{N_{sub}}^H) = I_{N_d} \otimes \overline{D}_H^{(v,\mu)}, \quad (41)$$

where $\overline{D}_H^{(v,\mu)} := diag[H^{(v,\mu)}(0), \ldots, H^{(v,\mu)}(N_{sub}-1)]$, and $H^{(v,\mu)}(m) := \sum_{q=0}^{Q} h_q^{(v,\mu)} e^{-j\frac{2\pi q}{N_{sub}}m}$.

To decode the ST block code, we need to simplify our input-output relationship using (41). Based on (37) and (41), after CP removal and FFT processing, we obtain $$\overline{y}_v := (I_{N_d} \otimes F_{N_{sub}})(I_{N_d} \otimes R_{cp})y_v \quad (42)$$

$$= \rho \sum_{\mu=1}^{N_t} (I_{N_d} \otimes \overline{D}_H^{(v,\mu)})[C]_\mu + (I_{N_d} \otimes F_{N_{sub}})(I_{N_d} \otimes R_{cp})\eta_v,$$

where $[C]_\mu$ stands for the μth column of C. Plugging $[C]_\mu$ into (38), we rewrite $\overline{y}_v$ as:

$$\overline{y}_v = \rho \sum_{i=1}^{N_s} \left( \sum_{\mu=1}^{N_t} [A_i]_\mu \otimes (\overline{D}_H^{(v,\mu)} u_i) + \sum_{\mu=1}^{N_t} [B_i]_\mu \otimes (\overline{D}_H^{(v,\mu)} u_i^*) \right) + \overline{\eta}_v, \quad (43)$$

where $\overline{\eta}_v := (I_{N_d} \otimes F_{N_{sub}})(I_{N_s} \otimes R_{cp})\eta_v$, and $[A_i]_\mu$ and $[B_i]_\mu$ are the μth columns of $A_i$ and $B_i$, respectively.

Similar to the DPS decoding scheme, MRC is utilized to combine the received blocks from different antennas. Based on the orthogonality of $A_i$'s and $B_i$'s in (39), for each receive antenna, our decoding matrix:

$$G_i^{(v)} = \left[ \sum_{\mu=1}^{N_t} [A_i]_\mu^T \otimes (\overline{D}_H^{(v,\mu)})^*, \sum_{\mu=1}^{N_t} [B_i]_\mu^T \otimes \overline{D}_H^{(v,\mu)} \right], \quad (44)$$

$\forall i \in [0, N_s-1], v \in [1, N_r]$.

To implement the MRC, we use the combiner:

$$G_i = \sqrt{N_t} \left( \sum_{v=1}^{N_r} \sum_{\mu=1}^{N_t} \overline{D}_H^{(v,\mu)} (\overline{D}_H^{(v,\mu)})^* \right)^{-\frac{1}{2}} [G_i^{(1)}, \ldots, G_i^{(N_r)}], \quad (45)$$

$\forall i \in [0, N_s-1]$.

Here, for the CP-based scheme only, we need to modify A5) as follows:

A5') Channels $\overline{D}_H^{(v,\mu)}$ are coprime; i.e., $$\det(\sum_{v=1}^{N_r} \sum_{\mu=1}^{N_t} \overline{D}_H^{(v,\mu)} (\overline{D}_H^{(v,\mu)})^*) \neq 0.$$

Under A5') we have $G_i G_i^H = I$. At the receiver, the ith sub-block corresponding to $\mu_i$ is $$z_i = G_i [\overline{y}_1^T, \overline{y}_1^H, \ldots, \overline{y}_{N_r}^T, \overline{y}_{N_r}^H]^T \quad (46)$$

$$= \rho \left( \sum_{v=1}^{N_r} \sum_{\mu=1}^{N_t} \overline{D}_H^{(v,\mu)} (\overline{D}_H^{(v,\mu)})^* \right)^{\frac{1}{2}} u_i + \xi_i, \forall i \in [0, N_s-1],$$

where $\xi_i := G_i [\overline{\eta}_1^T, \overline{\eta}_1^H, \ldots, \overline{\eta}_{N_r}^T, \overline{\eta}_{N_r}^H]^T$ is a circular AWGN vector.

The outer STDO encoder Θ is designed as $$\Theta = I_{N_s} \otimes \overline{\Theta}. \quad (47)$$

Figure 4:
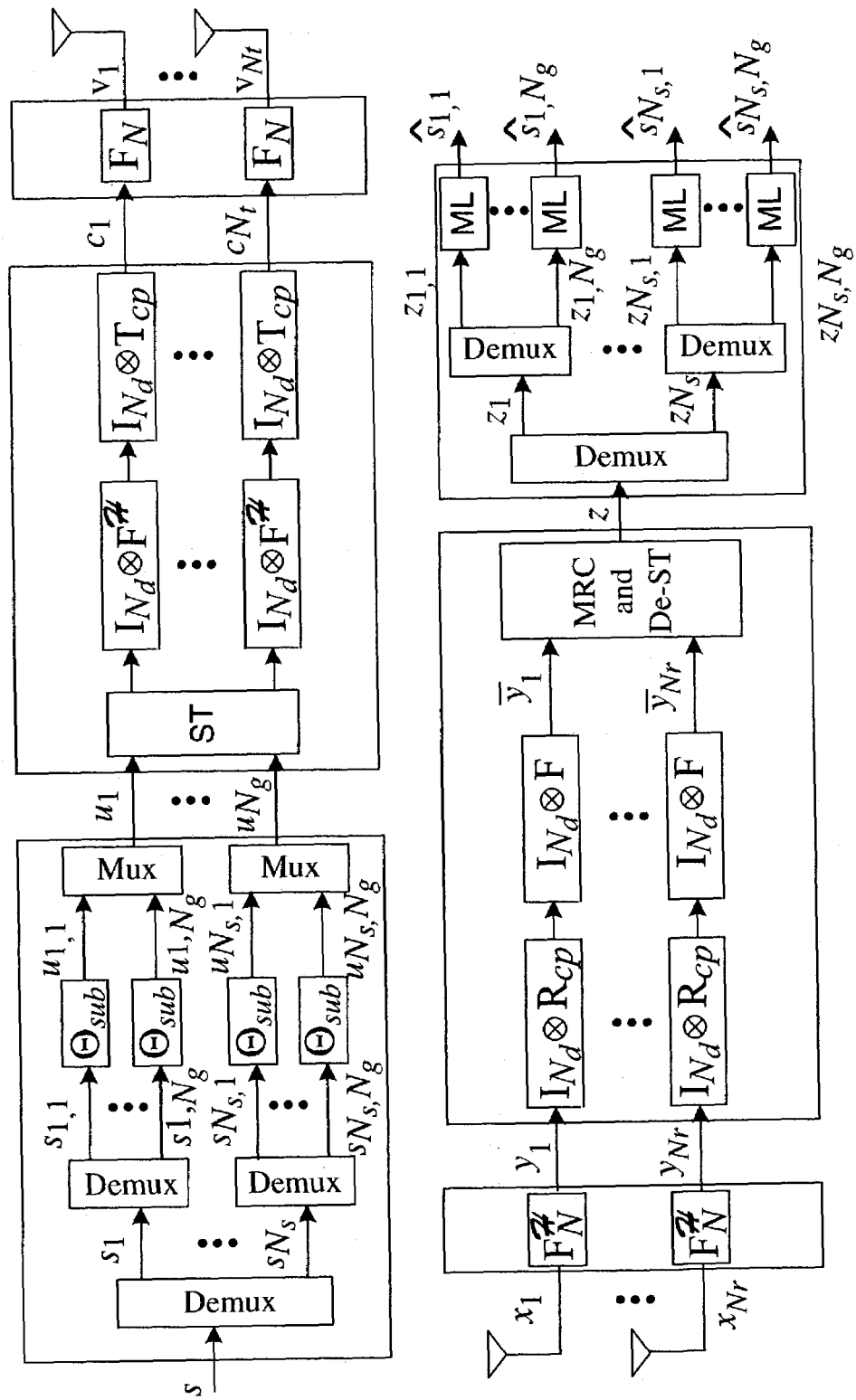
FIG. 4 is a block diagram illustrating an example CP-based STDO transceiver.

The ith sub-block is precoded by $\overline{\Theta}$; i.e., $u_i = \overline{\Theta} s_i$, $\forall i \in [0, N_s-1]$. As in the DPS design, in order to reduce the decoding complexity, we again pursue the design $\overline{\Theta}$ in a grouped form. Since the equivalent channel matrix between $z_i$ and $s_i$ is diagonal, we can write the gth group of $z_i$, as defined as $z_{i,g}$, as:

$$z_{i,g} = \frac{\rho}{\sqrt{N_t}} \left( \sum_{\nu=1}^{N_r} \sum_{\mu=1}^{N_t} \overline{D}_{H,g}^{(\nu,\mu)} (\overline{D}_{H,g}^{(\nu,\mu)})^* \right)^{\frac{1}{2}} \Theta_{sub} s_{i,g} + \xi_{i,g}, \quad (48)$$

$$\forall i \in [0, N_s - 1], g \in [0, N_g - 1],$$

where $\Theta_{sub}$ is an $\overline{N}_{sub} \times \overline{N}_{sub}$ matrix designed according to [24] with $\overline{N}_{sub} = N_{sub}/N_g$. Again, ML decoding for $s_{i,g}$ can be performed by using sphere-decoding with block size $\overline{N}_{sub}$. Based on (14), we can verify that our CP-based approach constitutes also a linearly coded transmission. When $N_{sub} \geq (Q+1)$, the maximum diversity order $r_h$ is guaranteed. Furthermore, when $r_h = N_r N_t(Q+1)$, and we select $\overline{N}_{sub} = Q+1$, the coding gain for this CP-based scheme satisfies [c.f. (15)]:

$$(\ln 2)(\det(R_h))^{\frac{1}{r_h}} \frac{N_{sub} d_{min}^2}{(N_{sub}+Q)N_t} \leq G_c \leq (\det(R_h))^{\frac{1}{r_h}} \frac{N_{sub} d_{min}^2}{(N_{sub}+Q)N_t}, \quad (49)$$

where the upper bound is achieved when $\overline{N}_{sub} = Q+1$ satisfies a certain algebraic property [24]. A proof for the diversity and coding gains for CP-based scheme is given in Appendix D. As $N_{sub}$ increases ($\rho \to 1$), the coding gain of our CP-based design in (49) approaches the maximum coding gain in (15). The encoding and decoding processes of the CP-based approach are summarized in the block diagram of FIG. 4. And our results are collected in the following proposition:

Proposition 3 CP-based STDO block codes guarantee the maximum space-Doppler diversity $G_d = r_h$, when $\overline{N}_{sub} \geq Q+1$, and offer low (FFT based) sphere decoding complexity at the receiver. When the channel correlation matrix $R_h$ has full rank $N_r N_t(Q+1)$, the CP-based design achieves the maximum coding gain $G_c^{max}$ of linearly coded systems, asymptotically, as $N_{sub}$ increases. The transmission rate of CP-based design is $r_{sibc} N_{sub}/(N_{sub}+Q)$, where $r_{sibc}$ is the rate of block ST codes.

In the ZP-based approach, zero padding (ZP) replaces the CP guard. Similar to the CP-based design, there are two stages of the middle STDO codec. The first stage implements the GCOD, which is similar to (38), while the second eliminates IBI by padding zeros after each sub-block.

A scalar GCOD can be extended to the block-based GCOD:

$$C_{N_j N_{sub} \times N_t} = \sum_{i=0}^{N_s - 1} [A_i \otimes u_i + B_i \otimes (P_1 u_i^*)], \quad (50)$$

where $u_i$ is defined as in (50); $P_1$ is a time-reversal matrix with entries $[P_1]_{p,q} = \delta(p+q-N_{sub}-1)$; and the matrices $\{A_i \in \mathbb{R}^{N_d \times N_t}, B_i \in \mathbb{R}^{N_d \times N_t}, \forall i \in [0, N_s-1]\}$ are defined as in (39). As for the second stage of the middle STDO encoder, instead of inserting the CP as in Section V.A, we insert leading and trailing zeros in each sub-block. Based on the design of the inner codec in (36) and the middle STDO encoder, the input-output relationship from C to $y_\nu$ is:

$$y_\nu = \sum_{\mu=1}^{N_t} H^{(\nu,\mu)} (I_{N_d} \otimes T_{zp})[C]_\mu + \eta_\nu, \quad (51)$$

where $T_{zp} := [0_{N_{sub} \times Q/2} I_{N_{sub}} 0_{N_{sub} \times Q/2}]^T$ implements the ZP insertion. We can verify that $$H^{(\nu,\mu)}(I_{N_d} \otimes T_{zp}) = I_{N_d} \otimes (\overline{H}^{(\nu,\mu)} T_{zp}), \quad (52)$$

where the $(N_{sub}+Q) \times (N_{sub}+Q)$ circulant matrix $\overline{H}^{(\nu,\mu)}$ has the same structure as $H^{(\nu,\mu)}$. The outer STDO encoder $\Theta$ is selected here to be an identity matrix; i.e., u=s.

At the receiver, to decode the ST block code and combine the results from different receive antennas, we use the MRC matrix $$G_i^{(\nu)} = \left[ \sum_{\mu=1}^{N_t} [A_i]_\mu^T \otimes (\overline{H}^{(\nu,\mu)})^{\mathcal{H}} \sum_{\mu=1}^{N_t} [B_i]_\mu^T \otimes (\overline{H}^{(\nu,\mu)} P_2) \right], \quad (53)$$

$$\forall i \in [0, N_s - 1],$$

where $P_2$ is an $(N_{sub}+Q) \times (N_{sub}+Q)$ time reversal matrix. Two properties of time-reversal matrices will com handy at this point [26]:

$$P_2 T_{zp} = T_{zp} P_1; \quad \text{P1)}$$

$$P_2 = F_{N_{sub}+Q}^H F_{N_{sub}+Q}^H = F_{N_{sub}+Q} F_{N_{sub}+Q}. \quad \text{P2)}$$

Using P1) and P2), we can verify by direct substitution that $$P_2(\overline{H}^{(\nu,\mu)})^* T_{zp} P_1 = F_{N_{sub}+Q}^H F_{N_{sub}+Q}^H (\overline{H}^{(\nu,\mu)})^* F_{N_{sub}+Q} T_{zp} = (\overline{H}^{(\nu,\mu)})^H T_{zp}. \quad (54)$$

From the circulant structure of $\overline{H}^{(\nu,\mu)}$, it also follows that $\overline{H}^{(\nu,\omega)} (\overline{H}^{(\nu,\mu)}) = (\overline{H}^{(\nu,\mu)})^H \overline{H}^{(\nu,\mu)}$. Similar to A5) and A5'), before we define the matrix to combine the multiple receive antennas, we need the following assumption:

A5'') Channels $H^{(\nu,\mu)}$ are coprime; i.e., $$\det \left( \sum_{\nu=1}^{N_r} \sum_{\mu=1}^{N_t} \overline{H}^{(\nu,\mu)} (\overline{H}^{(\nu,\mu)})^* \right) \neq 0.$$

Based on this commutativity and (54), by defining $$G_i = \sqrt{N_t} \left( \sum_{\nu=1}^{N_r} \sum_{\mu=1}^{N_t} \overline{H}^{(\nu,\mu)} (\overline{H}^{(\nu,\mu)})^{\mathcal{H}} \right)^{-\frac{1}{2}} [G_i^{(1)}, \ldots, G_i^{(N_r)}], \quad (55)$$

$$\forall i \in [0, N_s - 1],$$

and combining the multiple receive antennas, we obtain $$z_i = G_i [y_1^T, y_1^{\mathcal{H}}, \ldots, y_{N_r}^T, y_{N_r}^{\mathcal{H}}]^T \quad (56)$$

-continued $$= \frac{1}{\sqrt{N_t}} \left( \sum_{v=1}^{N_r} \sum_{\mu=1}^{N_t} \overline{H}^{(v,\mu)} (\overline{H}^{(v,\mu)})^{\mathcal{H}} \right)^{\frac{1}{2}} T_{zp} s_i + \xi_i,$$

$$\forall i \in [0, N_s - 1].$$

To decode $s_i$ from $z_i$, $G(\bullet)$ can again rely on sphere-decoding implemented on blocks of size $N_{sub}$.

The performance of the SP-based scheme can be analyzed. The Euclidean distance between distance between $z_i$ and $z_i'$ as:

$$d^2(z_i, z_i') = \frac{1}{N_t} \sum_{v=1}^{N_r} \sum_{\mu=1}^{N_t} \|E_i h^{(v,\mu)}\|^2, \quad (57)$$

where $E_i$ is a Toeplitz matrix generated by $e_i = s_i - s_i'$. When $r_h = N_r N_t (Q+1)$, we find that the coding gain in this is $$G_c = (\det(R_h))^{\frac{1}{r_h}} \frac{d_{min}^2}{N_t}. \quad (58)$$

Figure 5:
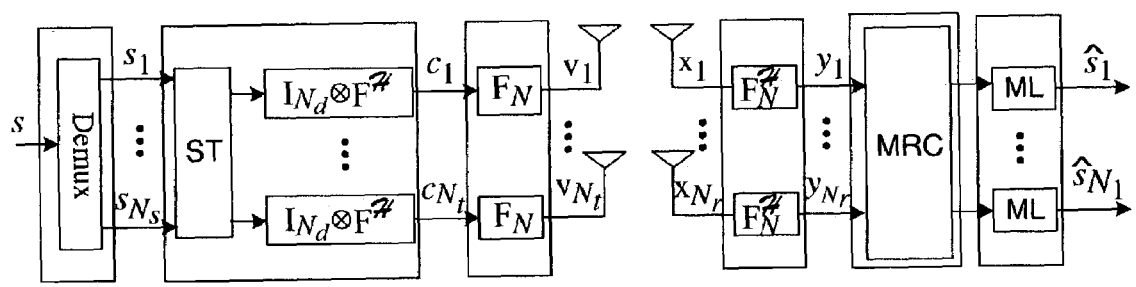
FIG. 5 is a block diagram illustrating an example ZP-based STDO transceiver.

The coding and decoding processes for the ZP-based scheme are summarized in FIG. 5.

Proposition 4 ZP-based STDO block codes guarantee the maximum space-Doppler diversity $G_d = r_h$, $\forall N_{sub} > 0$. When the channel correlation matrix $R_h$ has full rank $N_t N_r (Q+1)$, the ZP-based design achieves the maximum coding gain $G^{max}$ of linearly coded systems. The transmission rate of ZP-based design is $r_{sibc} N_{sub}/(N_{sub}+Q)$, where $r_{sibc}$ is the rate of the block ST codes.

Comparing our three STDO designs, we note that: i) all schemes guarantee the maximum diversity gain; ii) DPS and ZP-based schemes achieve also the maximum coding gain, while the CP-based scheme achieves the maximum coding gain asymptotically (as $N_{sub}$ increases); iii) to guarantee the maximum diversity gain, the CP-based scheme provides the lowest decoding complexity; iv) to deal with IBI, CP- and ZP-based approaches rely on CP or ZP guards, which consume extra bandwidth compared with DPS scheme that does not require any guard. Furthermore, together with GCOD design benefits, our CP- and ZP-based STDO codecs inherit also its limitation in suffering up to 50% rate loss, when $N_t > 2$ antennas are signaled with complex constellations. Notwithstanding, the DPS attains full rate for any $N_t$.

EXAMPLES

Figure 6:
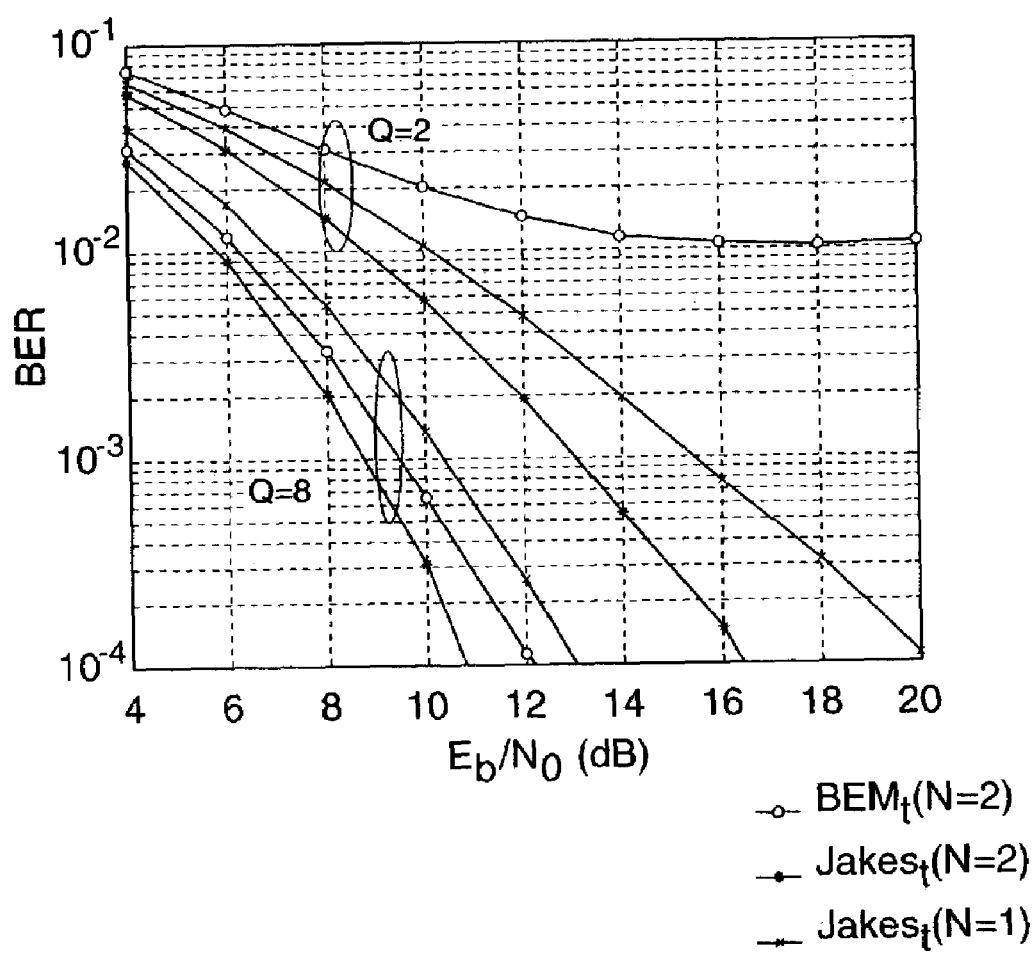
FIGS. 6-10 are graphs that illustrate exemplary results of simulations of the described techniques.

Test Case 1: To validate the BEM, we utilize the widely accepted Jakes' model, with a carrier frequency of $f_0 = 900$ MHz, and a mobile speed $v_{max} = 96$ km/hr. The transmitted block length is $N = 25$. Two transmit-antennas ($N_t = 2$) and one receive-antenna ($N_r = 1$) is considered. Since we want to test the model matching and the diversity for different Q's, we select the symbol period $T_s = Q/(2f_{max} N)$. We generate all multiple channels using this Jakes' model. At the transmitter, we adopt our DSP design based on the knowledge of Q and $N_t = 2$. At the receiver, we consider two different scenarios: one uses the parameters generated by Jakes' model (corresponding curves are marked by "Jakes" in FIG. 6); and the other one uses the BEM coefficients to approximate the Jakes' model. The channel generated by the Jakes' model has 200 paths, while BEM approximates Jakes' model by Q+1 BEM coefficients. MMSE equalization is used for both scenarios. FIG. 6 depicts the performance results. We observe that: i) our DPS design enables spatial diversity gains even for systems adhering to the Jakes' model: ii) when Q is small (Q=2), model mismatch between the BEM and the Jakes' model causes an error floor; and iii) when Q is large, the BEM matches the Jakes' model well, and the BER performance improves considerably.

Figure 7:
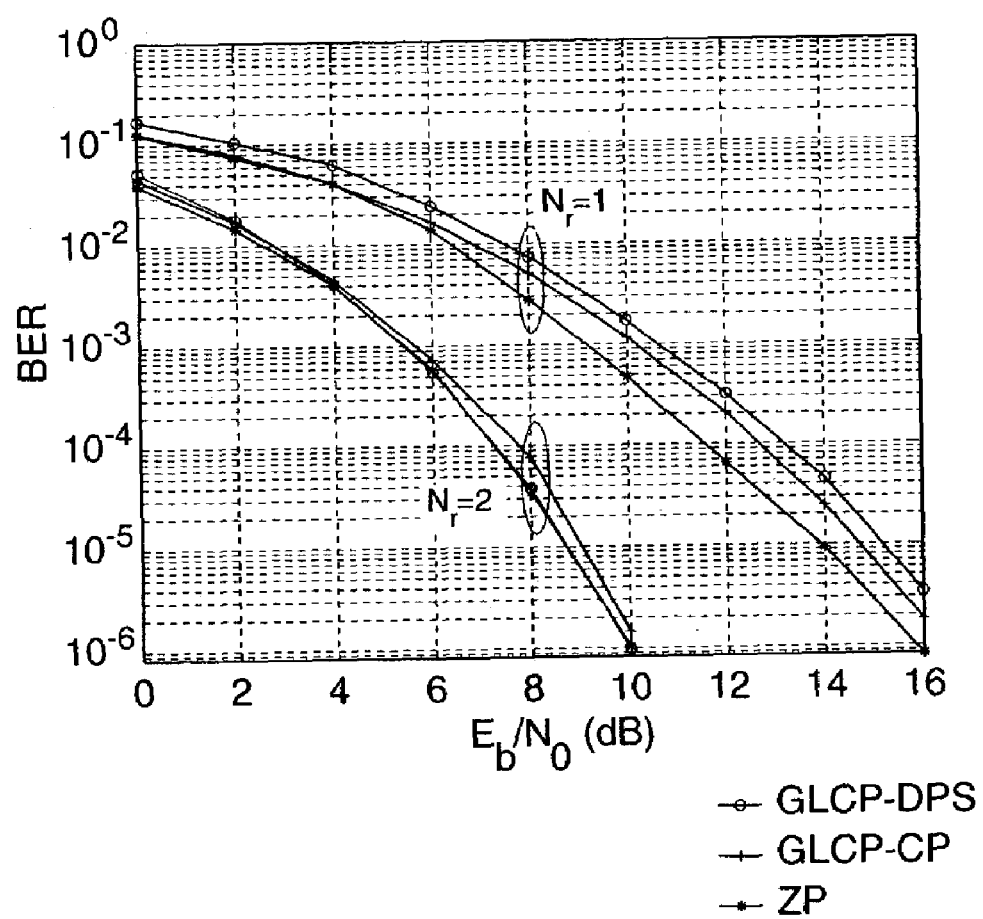

Test Case 2 (comparisons among the three STDO codecs): We compare DPS, CP-Based, and ZP-Based schemes with $N_t = 2$ transmit antennas, Q+1=3 bases per channel, and BEM parameters that are i.i.d., Gaussian, with mean zero, and variance 1/(Q+1). We choose QPSK modulation for all these schemes. The number of information symbols per block is P=K=24. For DPS, the transmitted block length N=24, while for CP- and ZP-based schemes, the block length N=28 because of the CP and ZP guards, respectively. The linear precoder with grouping is employed for DPS and CP-based schemes with group sizes $N_{sub} = 6$ and $\overline{N}_{sub} = 3$, respectively. FIG. 7 depicts the BER performance of these three codes. SD has been employed for all schemes. We observe that: i) from the slope of the BER curves for $N_r = 1$, all three schemes guarantee the maximum diversity order $G_d^{max} = N_t(Q+1) = 6$; ii) with either $N_r = 1$ or 2, the ZP-based scheme exhibits the best performance among the three; iii) compared with CP, the performance of DPS incurs about 0.5 dB loss at high SNR for $N_r = 1$; and iv) as $N_r$ increases, the performance difference among three schemes diminishes at high SNR.

Figure 8:
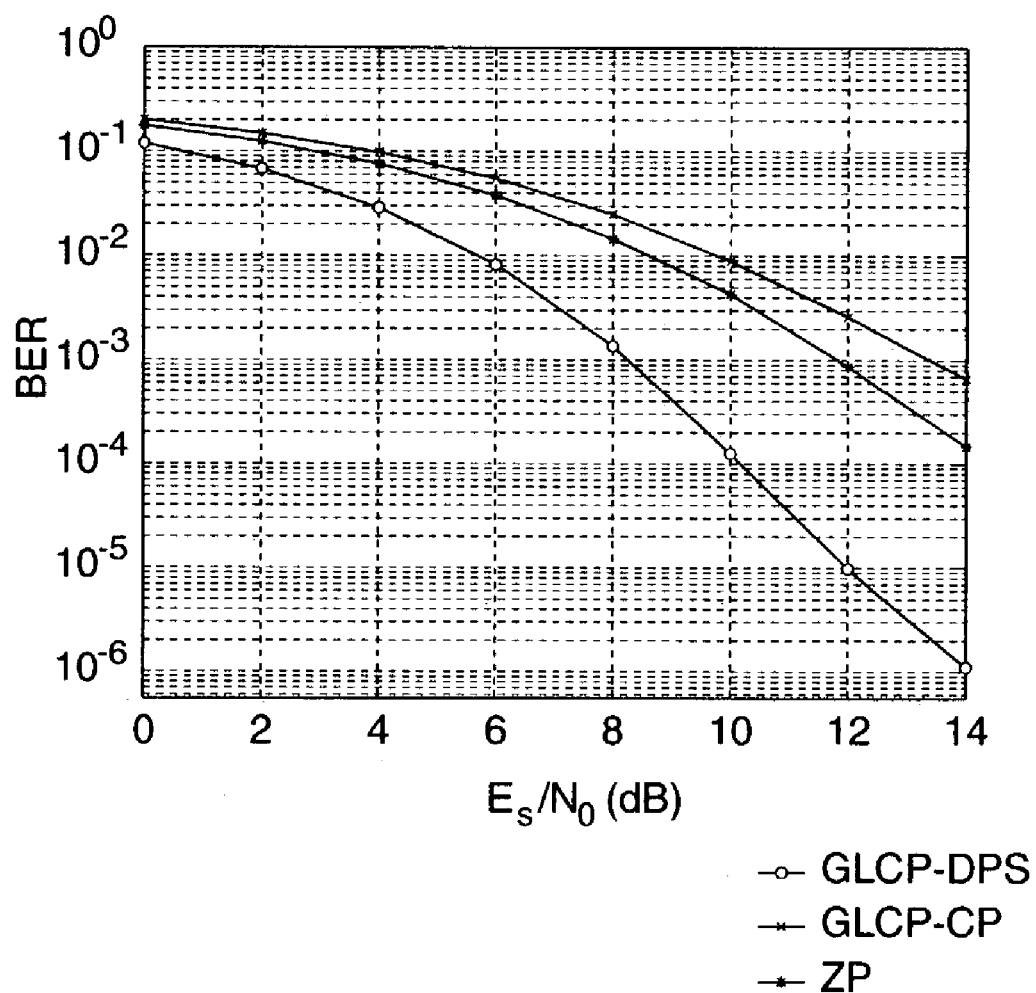

When $N_t > 2$, because of the ST block codes, CP- and ZP-based schemes will lose up to 50% rate. In contrast, the DPS scheme attains the full rate for any $N_t$. FIG. 8 depicts the performance of our three STDO when $N_t = 4$. For CP- and ZP-based schemes, we select the block ST code as in (38) which loses 50% rate. To maintain similar rates, we select QPSK for CP- and ZP-based schemes and BPSK for DPS with the same symbol power. The information block length is K=36. From FIG. 8, we observe that DPS outperforms both CP and ZP. Note that even in this case, CP- and ZP-based schemes have lower rate ((9/11) bit/sec/Hz) than DPS (1 bit/sec/Hz).

Figure 9:
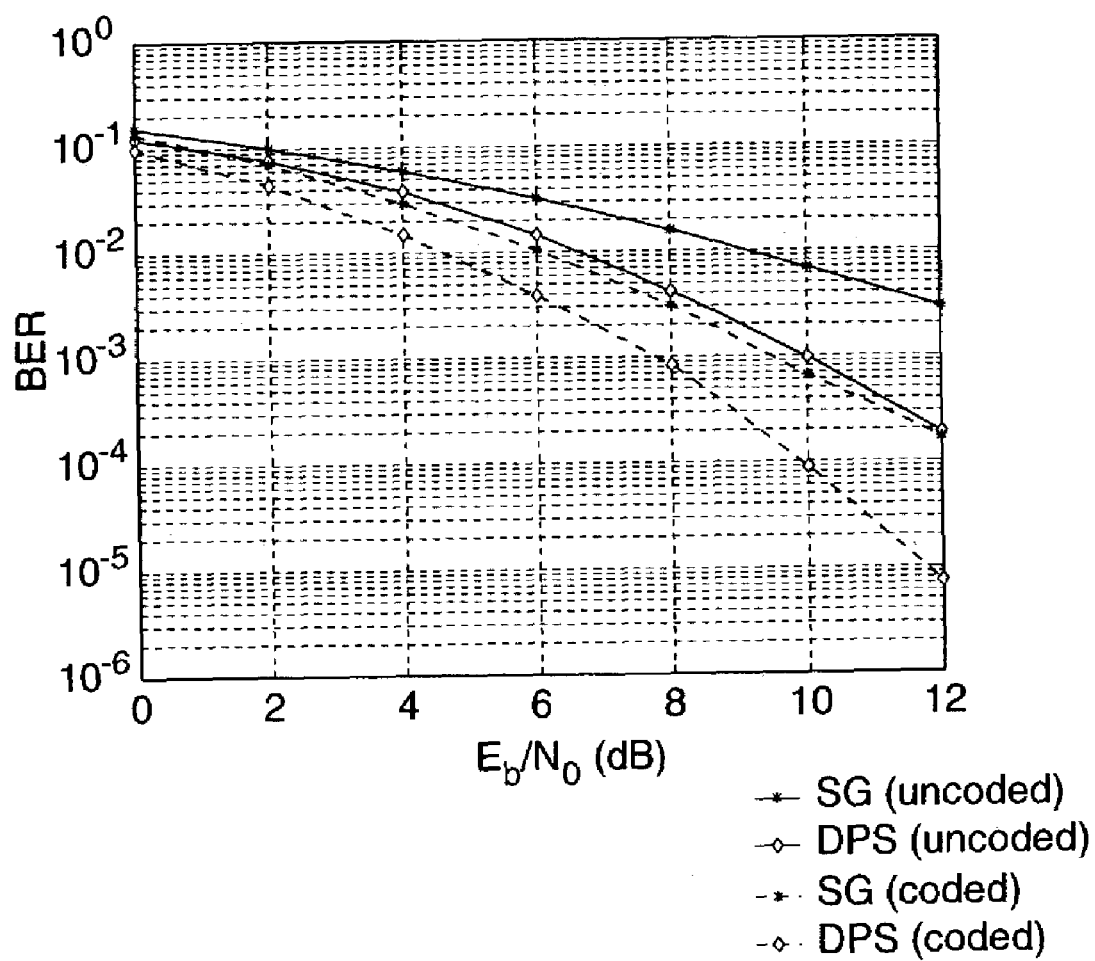

Test Case 3: In this example, we compare our DPS scheme with the smart-greedy code for $(N_t, N_r) = (2,1)$. To maintain the same rate, we select BPSK for our DPS scheme. Each channel has Q+1=3 bases, and the channel coefficients are i.i.e. with mean zero and variance 1/(Q+1). First, we consider the uncoded setup. The information block length is K=P=30. The number of groups for DPS is $N_g = 5$, so that these two schemes have comparable decoding complexity. FIG. 9 depicts the BER versus SNR comparison for the smart-greedy code, and our DPS (the solid lines). It is evident that DPS outperforms the "smart-greedy" coding because the former guarantees the full space-Doppler diversity.

Furthermore, we consider the coded case for both schemes. We select a (7,3) Reed-Solomon coder with block interleaving. The number of information bits is 90. Therefore, the length of the coded block of bits is 210. We select the depth of the block interleaver as 42. For the DPS design, we split the coded bits into 5 blocks. Each block is divided into 7 groups. The simulation results are shown in FIG. 9 (the dashed lines). Note that the DPS scheme still outperforms the smart-greedy codes remarkably.

Test Case 4 (correlated channels): In this example, we investigate the performance of our three schemes, when the channel coefficients are not i.i.d. The carrier frequency is now $f_0=2$ GHz, and the maximum mobile speed is $v_{max}=160$ km/hr. For these $f_0$ and $v_{max}$ values, we find that $f_{max} \approx 296.63$ Hz. The sampling period is defined as $T_s=Q/(2f_{max}N)$. We generate each channel correlation matrix $E[h^{(\nu,\mu)}(h^{(\nu,\mu)})^H]=U\Lambda$, where U is a $(Q+1)\times(Q_{real}+1)$ unitary matrix, and $\Lambda$ is a $(Q_{reak}+1)\times(Q_{real}+1)$ diagonal matrix. The ith entry of $\Lambda$ is $$\Lambda \text{ is } [\Lambda]_{i,i} = \gamma\left(\pi\sqrt{f_{max}^2 - ((i-2Q_{real})/(KT_s))^2}\right)^{-1},$$

where $\gamma$ is a normalizing factor. It is clear that the choice of entries of $\Lambda$ reflects the underlying Doppler spectrum. We consider the channels corresponding to different antennas to be independent. Then we generate $h^{(\nu,\mu)}=U\Lambda\bar{h}^{(\nu,\mu)}$, where the entries of $\bar{h}^{(\nu,\mu)}$ are i.i.d. with zero mean and unit variance. We consider $N_t=2$ and $N_r=1$ for all schemes. We select $Q=4$ and $Q_{real}=2$. For the CP-based scheme, we still use the GLCP method with group size $\bar{N}_{sub}=3$, while for the DPS method, we select $N_{sub}=6$. The information block length for all schemes is $K=36$. Hence, for CP- and ZP-based schemes, the transmitted block length is $N=44$. We select BPSK modulation throughout this experiment. The rate for DPS and the smart-greedy code of [2-] is 1 bit/sec/Hz, while the rate is (9/11) bits/sec/Hz for CP- and ZP-based schemes.

Figure 10:
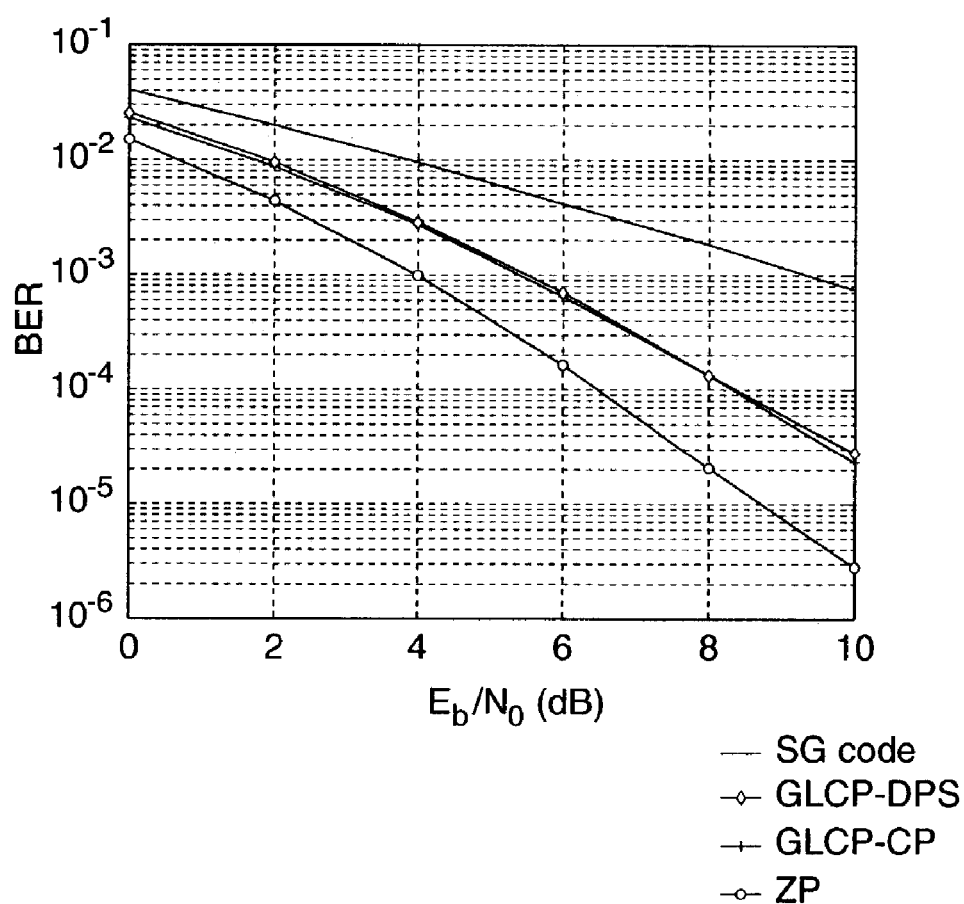

FIG. 10 depicts the BER performance for our three proposed schemes and the smart-greedy code. It can be seen that all our proposed schemes achieve full diversity (in this case it is $G_d=6$), and outperform the "smart-greedy" code. Compared with the CP-based and DPS schemes, the ZP-based scheme has about 1 dB gain at BER=$10^{-4}$. However, note that both CP- and ZP-based schemes have lower rate than DPS.

Various embodiments of the invention have been described. We described a basis expansion model (BEM) to benchmark the performance of multi-antenna space-time coded transmissions over correlated time-selective fading MIMO channels. Specifically, we expressed in closed form the maximum achievable space-Doppler diversity gain in terms of the number of transmit-receive antennae and the number of bases. Furthermore, we quantified in closed-form the maximum possible coding gain for all linearly coded space-time transmissions, and found it to depend on the rank of the BEM coefficients' correlation matrix and the minimum Euclidean distance of the constellation used.

In addition to performance limits, the BEM enabled us to develop space-time-Doppler (STDO) coded designs capable of achieving (or approaching) these gains, using only knowledge of the maximum Doppler spread. We established two neat BEM properties that played an instrumental role in these designs: i) multiple ($N_t$) BEMS with Q+1 bases each, can be rendered mathematically equivalent to a single faster BEM with $N_t(Q+1)$ bases, via a digital phase sweeping operation at the transmitters; and, ii) a BEM for time-selective channels is dual to a tapped delay line model for frequency-selective channels, which allows designs developed for one model to be used for the other, after incorporating appropriate FFT-based operations at the transmit-receive sides.

The first property led us to an STDO coded system based on a novel digital phase sweeping design, which collects the maximum joint space-Doppler diversity and large coding gains, while it facilitates application of SISO channel estimators, and affords a low-complexity modular implementation when working with linearly precoded small-size groups of symbols. Its unique feature is full rate (1 symbol/sec/Hz) operation, regardless of the constellation and the number of transmit-receive antennae. The second property showed us the way to adjust existing space-time coded designs maximizing space-multipath diversity over frequency-selective channels, to collect joint space-Doppler gains over our time-selective MIMO channel. Using the same property in the reverse direction, we established that the limits on coding gains we derived for the BEM, apply to space-time coded transmissions over frequency-selective MIMO channels as well. The multipath-inspired designs yielded space-time-Doppler coded block transmissions with cyclic prefix or zero padding guard intervals. The former system affords the lowest (FFT-based) complexity, while the latter exhibits the best performance. With two transmit-antennas they have full rate; but with more, they both suffer the same rate loss as space-time block orthogonal designs, with complex constellations.

All three designs were developed in a unifying framework that entails three-stages (outer-middle-inner) of encoding and decoding. Their relative strengths were delineated both analytically and with simulations that also compared them with an existing system. Both coded and uncoded transmissions were tested over i.i.d. and correlated channels, and confirmed that the proposed designs outperform existing alternatives as they exploit fully the joint space-Doppler diversity that becomes available with time-selective channels.

The described techniques can be embodied in a variety of receivers and transmitters including base stations, cell phones, laptop computers, handheld computing devices, personal digital assistants (PDA's), and the like. The devices may include a digital signal processor (DSP), field programmable gate array (FPGA), application specific integrated circuit (ASIC) or similar hardware, firmware and/or software for implementing the techniques. If implemented in software, a computer readable medium may store computer readable instructions, i.e., program code, that can be executed by a processor or DSP to carry out one of more of the techniques described above. For example, the computer readable medium may comprise random access memory (RAM), read-only memory (ROM), non-volatile random access memory (NVRAM), electrically erasable programmable read-only memory (EEPROM), flash memory, or the like. The computer readable medium may comprise computer readable instructions that when executed in a wireless communication device, cause the wireless communication device to carry out one or more of the techniques described herein. These and other embodiments are within the scope of the following claims.

The invention claimed is:

1. A wireless communication device comprising:
   a first coder that linearly precodes a data stream to produce a precoded data stream;
   a second coder that processes the precoded data stream in accordance with a doppler spread of time-selective communication channels to produce a transformed data stream; and
   an antenna to output a waveform in accordance with the transformed data stream.

2. The wireless communication device of claim 1, wherein the second coder processes the precoded data stream in accordance with a Basis Expansion Model (BEM) for the channels to produce the transformed data stream.

3. The wireless communication device of claim 2, wherein the second coder samples the data stream to collect blocks of frequency-domain samples, and processes the collected blocks of samples to transform the frequency-domain samples to time-domain samples for the transformed data stream.

4. The wireless communication device of claim 3, wherein the second coder collects blocks of Q+1 frequency-domain samples, wherein Q is a selected as a function of the doppler spread of the channels.

5. The wireless communication device of claim 3, further comprising a modulator to process blocks of N symbols within the transformed data stream at a symbol period $T_s$ to produce the waveform for transmission with the antennas, and wherein the second coder samples the precoded data stream with a period of $1/N*T_s$ to collect the samples.

6. The wireless communication device of claim 5, wherein $Q=2*\lceil f_{max}*T_sN \rceil$, where $f_{max}$ represents the doppler spread of the channels.

7. The wireless communication device of claim 5, further comprising a power splitter to produce a plurality of mirrored data streams from the transformed data stream, and wherein the antenna comprises one of a plurality of antennas to output waveforms in accordance with the mirrored data streams.

8. The wireless communication device of claim 7, further comprising a digital phase sweeping module that computes a single channel vector from estimates of doppler offset for the channels, and process the mirrored data streams with the single channel vector to shift a basis of each of the channels so that the basis become consecutive within a Fast Fourier Transform (FFT) grid.

9. The wireless communication device of claim 7, further comprising a modulator to modulate each mirrored data stream and produce the waveforms for transmission with the respective antennas.

10. The wireless communication device of claim 1, wherein the first coder comprises a linear constellation precoder.

11. The wireless communication device of claim 1, wherein the first coder applies a unitary matrix to blocks of M symbols of the data stream.

12. The wireless communication device of claim 1, wherein the waveform is a multi-carrier waveform.

13. The wireless communication device of claim 1, wherein the waveform is single-carrier waveform.

14. The wireless communication device of claim 1, wherein the first coder linearly precedes the data stream by applying a matrix to symbols blocks of the data stream, wherein the matrix has a size that is an integer function of the number of antennas and the doppler spread.

15. The wireless communication device of claim 14, wherein the blocks include N symbols, where N is selected as a function of the number of antennas $N_t$ and the doppler spread of the channels.

16. The wireless communication device of claim 14, wherein the first coder divides each of the symbol blocks of the data stream into $N_g$ groups, where each group has $N_{sub}$ symbols, and $N_{sub}$ is an integer function of the number of antennas and the doppler spread.

17. The wireless communication device of claim 16, wherein the matrix applied by the linear precoder has a size of $N_{sub} \times N_{sub}$.

18. The wireless communication device of claim 1, wherein the wireless communication device comprises one of a base station and a mobile device.

19. A wireless communication device comprising:
a demodulator that receives a waveform from a plurality of time-selective multipath communication channels and produces a demodulated data stream; and
a decoder that decodes the demodulated data in accordance with a Basis Expansion Model (BEM) that parameterizes time-selective communication multi-path channels as a function of frequency-selective multi-path communication channels.

20. The wireless communication device of claim 19, wherein the decoder applies an N×N matrix to the demodulated data, wherein the N is selected as a function of a doppler spread of the frequency-selective multi-path communication channels.

21. A method comprising:
estimating a doppler spread for a plurality of channels from a transmitter to a receiver;
applying a linear precoder to a data stream to form a precoded data stream;
processing the precoded data stream in accordance with the doppler spread to produce a transformed data stream; and
transmitting a waveform with an antenna in accordance with the transformed data stream.

22. The method of claim 21, wherein processing the precoded data stream comprise processing the precoded data stream in accordance with a Basis Expansion Model (BEM) for the channels to produce the transformed data stream.

23. The method of claim 21, wherein processing the precoded data stream comprises:
sampling the data stream to collect blocks of frequency-domain samples;
processing the collected blocks of samples to transform the frequency-domain samples to time-domain samples; and
outputting the transformed data stream based on the time-domain samples.

24. The method of claim 23, wherein sampling the precoded data stream comprises collecting blocks of Q+1 frequency-domain samples, wherein Q is a selected as a function of the doppler spread of the channels.

25. The method of claim 23, further comprising modulating blocks of N symbols within the transformed data stream at a symbol period $T_s$ to produce the waveform for transmission with the antennas.

26. The method of claim 25, wherein sampling the precoded data stream comprises sampling the precoded data stream with a period of $1/N*T_s$ to collect the samples.

27. The method of claim 25, wherein $Q=2*\lceil f_{max}*T_s*N \rceil$, where $f_{max}$ represents the doppler spread of the channels.

28. The method of claim 21, further comprising:
splitting the power of the transformed data stream to produce a plurality of mirrored data streams; and
transmitting the mirrored data stream with respective antennas.

29. The method of claim 28, further comprising:
computing a single channel vector from the estimated doppler offset; and
processing the mirrored data streams with the single channel vector to shift a basis of each of the channels so that basis become consecutive within a Fast Fourier Transform (FFT) grid.

30. The method of claim 21, wherein applying a linear precoder comprises applying a linear constellation precoder.

31. The method of claim 21, wherein the waveform is a multi-carrier waveform.

32. The method of claim 21, wherein the waveform is a single-carrier waveform.

33. The method of claim 21, wherein applying a linear precoder comprises:
   selecting a block size N as a function of the number of antennas $N_t$ and the doppler spread; and
   applying a matrix to symbol blocks of the data stream, wherein the matrix has a size that is selected as a function of the number of antennas and the doppler spread.

34. The method of claim 33, wherein applying a linear precoder comprises:
   dividing each of the blocks of the data stream into $N_g$ groups, where each group has $N_{sub}$ symbols, and $N_{sub}$ is selected as a function of the number of antennas and the doppler spread; and
   applying the matrix to each of the symbol groups within the blocks, wherein the matrix has a dimension that is a function of the number of symbols $N_{sub}$ within the groups.

35. The method of claim 34, wherein the size of the matrix is $N_{sub} \times N_{sub}$.

36. A computer-readable medium comprising instructions to cause a programmable processor of a wireless communication device to:
   estimate a doppler spread for a plurality of channels from a transmitter to a receiver;
   apply a linear precoder to a data stream to form a precoded data stream;
   process the precoded data stream in accordance with the doppler spread to produce a transformed data stream; and
   transmit a waveform with an antenna in accordance with the transformed data stream.

37. The computer-readable medium of claim 36, further comprising instructions to cause the programmable processor to process the precoded data stream comprise processing the precoded data stream in accordance with a Basis Expansion Model (BEM) for the channels to produce the transformed data stream.

38. The computer-readable medium of claim 36, further comprising instructions to cause the programmable processor to:
   sample the data stream to collect blocks of frequency-domain samples;
   process the collected blocks of samples to transform the frequency-domain samples to time-domain samples; and
   output the transformed data stream based on the time-domain samples.

* * * * *